US011898369B2

(12) United States Patent
Wang

(10) Patent No.: US 11,898,369 B2
(45) Date of Patent: Feb. 13, 2024

(54) DOOR LOCK

(71) Applicant: Illinois Tool Works Inc., Glenview, IL (US)

(72) Inventor: Yang Wang, Dongguan (CN)

(73) Assignee: Illinois Tool Works Inc., Glenview, IL (US)

( * ) Notice: Subject to any disclaimer, the term of this patent is extended or adjusted under 35 U.S.C. 154(b) by 257 days.

(21) Appl. No.: 16/607,990

(22) PCT Filed: Jun. 15, 2018

(86) PCT No.: PCT/US2018/037771
§ 371 (c)(1),
(2) Date: Oct. 24, 2019

(87) PCT Pub. No.: WO2018/236684
PCT Pub. Date: Dec. 27, 2018

(65) Prior Publication Data
US 2021/0108447 A1 Apr. 15, 2021

(30) Foreign Application Priority Data
Jun. 19, 2017 (CN) ......................... 201710465942.0
May 18, 2018 (CN) ......................... 201810482146.2

(51) Int. Cl.
*E05B 41/00* (2006.01)
*D06F 37/28* (2006.01)
(Continued)

(52) U.S. Cl.
CPC .............. *E05B 41/00* (2013.01); *D06F 37/28* (2013.01); *A47L 15/4259* (2013.01);
(Continued)

(58) Field of Classification Search
CPC ...... D06F 37/28; D06F 39/14; A47L 15/4259; E05B 47/0002; E05B 47/0003;
(Continued)

(56) References Cited

U.S. PATENT DOCUMENTS 4,620,735 A * 11/1986 Heydner ................. D06F 37/42
292/144
7,306,266 B2 * 12/2007 Hapke ..................... D06F 37/42
292/192
(Continued)

FOREIGN PATENT DOCUMENTS

CN 104233712 A * 12/2014
CN 105386277 A * 3/2016
(Continued)

OTHER PUBLICATIONS

International Search Report for PCT/US2018/037771; dated Oct. 16, 2018.
(Continued)

*Primary Examiner* — Christine M Mills
*Assistant Examiner* — Peter H Watson
(74) *Attorney, Agent, or Firm* — Boyle Fredrickson, S.C.

(57) ABSTRACT

The present application provides a door lock, comprising a main sliding block, the main sliding block being able to move to and fro between a locked position and a released position along a first direction (length direction), and the main sliding block being able to lock the door lock when at the locked position, and the main sliding block being able to release the door lock when at the released position; and an indicating sliding block, the indicating sliding block being able to move to and fro between a closed position and an open position along the first direction (length direction) when the main sliding block moves to and fro between the locked position and the released position along the first
(Continued)

direction (length direction), wherein the closed position and the open position of the indicating sliding block are used for indicating whether the door lock is in a locked state or in a released state. The door lock of the present application can make the output state of a door lock state indicating apparatus stable.

14 Claims, 21 Drawing Sheets

(51) Int. Cl.

| | |
|---|---|
| ***A47L 15/42*** | (2006.01) |
| ***D06F 37/42*** | (2006.01) |
| ***D06F 39/14*** | (2006.01) |
| ***E05B 47/00*** | (2006.01) |
| ***E05C 3/30*** | (2006.01) |

(52) U.S. Cl.
CPC .............. *D06F 37/42* (2013.01); *D06F 39/14* (2013.01); *E05B 47/0004* (2013.01); *E05B 2047/0067* (2013.01); *E05C 3/30* (2013.01); *E05Y 2201/474* (2013.01); *E05Y 2400/445* (2013.01); *E05Y 2900/304* (2013.01); *E05Y 2900/312* (2013.01)

(58) Field of Classification Search
CPC .. E05B 47/0004; E05B 47/06; E05B 47/0603; E05B 47/0696; E05B 2047/0067; E05B 2047/0068; E05B 2047/0069; E05B 81/64; E05B 81/66; E05B 81/70; E05B 81/72; E05B 41/00; Y10T 292/0948; Y10T 292/0956; Y10T 292/1043; Y10T 292/1044; Y10T 292/1047; Y10T 292/1078; Y10T 292/1082; Y10T 292/68; Y10T 292/696; Y10T 292/699; Y10T 292/702; Y10S 292/04; Y10S 292/69
See application file for complete search history.

(56) References Cited

U.S. PATENT DOCUMENTS

| | | | | |
|---|---|---|---|---|
| 2007/0296225 | A1 * | 12/2007 | Ashton | E05B 13/10 429/97 |
| 2011/0062839 | A1 | 3/2011 | Kim et al. | |
| 2011/0101840 | A1 * | 5/2011 | Kasack | D06F 37/42 292/144 |
| 2015/0225886 | A1 * | 8/2015 | Rocchitelli | E05C 1/08 292/38 |
| 2017/0067270 | A1 * | 3/2017 | Lang | E05B 47/0002 |
| 2018/0008120 | A1 * | 1/2018 | Dirnberger | A47L 15/4259 |

FOREIGN PATENT DOCUMENTS

| | | | | | |
|---|---|---|---|---|---|
| CN | 106012427 | A | | 10/2016 | |
| DE | 102016008317 | A1 | * | 1/2018 | E05C 3/14 |
| DE | 102017006649 | B3 | * | 9/2018 | D06F 37/28 |
| EP | 1498796 | A1 | | 1/2005 | |
| KR | 100888655 | B1 | * | 3/2009 | D06F 37/28 |
| WO | WO-2013181289 | A1 | * | 12/2013 | D06F 37/42 |
| WO | 2016/082744 | | | 6/2016 | |
| WO | 2016082744 | A1 | | 6/2016 | |

OTHER PUBLICATIONS

Office Action for Application No. KR 10-2019-7034626 dated Sep. 12, 2022 and a machine translation from the USPTO's Global Dossier accessed Oct. 7, 2022.
Office Action for Application No. JP 2019-570073 dated May 27, 2022 and a machine translation from the USPTO's Global Dossier accessed Jun. 14, 2022.

* cited by examiner

DOOR LOCK

TECHNICAL FIELD

The present application refers to a door lock for electrical equipment (e.g. washing machines, dish-washing machines).

BACKGROUND ART

Door locks can be used to control locking or opening of doors of electrical equipment (e.g. washing machines, dish-washing machines).

The present application provides a novel door lock mechanism to improve the operation of electrical equipment.

SUMMARY OF THE INVENTION

To improve the operation of electrical equipment, the present application provides a door lock for use in an electric appliance.

A first aspect of the present application seeks to protect a door lock, the door lock comprising:

- a main sliding block, the main sliding block being able to move to and fro between a locked position and a released position along a first direction (length direction), and the main sliding block being able to lock the door lock when at the locked position, and the main sliding block being able to release the door lock when at the released position; and an indicating sliding block, the indicating sliding block being able to move to and fro between a closed position and an open position along the first direction (length direction) when the main sliding block moves to and fro between the locked position and the released position along the first direction (length direction), wherein the closed position and the open position of the indicating sliding block are used for indicating whether the door lock is in a locked state or in a released state.

The door lock according to the first aspect of the present application further comprises an indicating apparatus, the indicating apparatus being able to output an indicating signal according to the closed position and the open position of the indicating sliding block, and the indicating signal being used for indicating whether the door lock is in the locked state or in the released state.

According to the door lock in the first aspect of the present application, the indicating sliding block is able to move to and fro between the closed position and the open position along the first direction (length direction); the indicating sliding block is able to move from the open position to the closed position when the main sliding block moves from the released position to the locked position; and the indicating sliding block is able to move from the closed position to the open position when the main sliding block moves from the locked position to the released position.

The door lock according to the first aspect of the present application further comprises an indicating latch, the indicating latch being able to accordingly move to and fro along a second direction (up-down direction) when the indicating sliding block moves to and fro along the first direction (length direction); and the indicating latch being used for starting the indicating apparatus so that the indicating apparatus outputs the indicating signal.

According to the door lock in the first aspect of the present application, the indicating sliding block is arranged at one side of the main sliding block, and the main sliding block brings the indicating sliding block to move from the closed position to the open position.

According to the door lock in the first aspect of the present application, a push arm is provided at one side of the main sliding block, and the push arm is able to bring the indicating sliding block to move from the closed position to the open position.

According to the door lock in the first aspect of the present application, the door lock further comprises a biasing apparatus, and the biasing apparatus pushes the indicating sliding block to move from the open position to the closed position.

According to the door lock in the first aspect of the present application, the biasing apparatus is a spring.

According to the door lock in the first aspect of the present application, the indicating sliding block comprises a stepped part, and the stepped part comprises an upper step and a lower step that are arranged by way of connection; a bearing surface and a recess are provided on the upper step, the bearing surface is arranged at a distal end of the upper step, the bearing surface is higher than the recess, a distal end of the recess is connected to the bearing surface, and an indicating sliding block restoration part is provided at an outer side face at a proximal end of the recess; an indicating sliding block release part is provided on an upper surface at a distal end of the lower step, a blocking surface is provided at a proximal end of the lower step, and the blocking surface is used for blocking the movement of the main sliding block when the main sliding block moves from the locked position to the released position; and the indicating sliding block protrusion locking claw extends out of an outer side face at the distal end of the lower step.

According to the door lock in the first aspect of the present application, the indicating sliding block restoration part comprises a restoration bevel, and the restoration bevel tilts inward in a direction from the distal end of the upper step to the proximal end; and the indicating sliding block release part comprises a rotation bevel, and the rotation bevel tilts outward in a direction from the proximal end of the lower step to the distal end.

The door lock according to the first aspect of the present application further comprises a door lock box, the door lock box comprising an indicating sliding block sliding chute, and the indicating sliding block sliding chute comprising an inside wall and an outside wall; a notch provided at a distal end of the inside wall, for accommodating the indicating sliding block protrusion locking claw, wherein a blocking surface is provided at a distal end of the notch, and the blocking surface is used for blocking the movement of the indicating sliding block when the main sliding block moves from the released position to the locked position along the first direction; and an indicating sliding block recovery bevel provided at a proximal end of the outside wall, for cooperating with the indicating sliding block restoration part to restore the indicating sliding block.

The door lock according to the first aspect of the present application can make the output state of a door lock state indicating apparatus stable.

A second aspect of the present application seeks to protect a door lock, the door lock comprising: a main sliding block, the main sliding block being able to move to and fro between a locked position and a released position along a first direction (length direction), and the main sliding block being able to lock the door lock when at the locked position, and the main sliding block being able to release the door lock when at the released position; an indicating sliding block, the indicating sliding block being able to move to and fro along the first direction (length direction) when the main sliding block moves to and fro between the locked position and the released position along the first direction (length direction); an indicating latch, the indicating latch being able to move to and fro on an upper surface of the indicating sliding block, and the indicating latch being able to accordingly move to and fro along a second direction (up-down direction) when the indicating sliding block moves to and fro along the first direction (length direction); and a switching apparatus, the indicating latch being able to close or disconnect the switching apparatus.

According to the door lock in the second aspect of the present application, the indicating sliding block is arranged at one side of the main sliding block, and the main sliding block brings the indicating sliding block to move from a closed position to an open position.

According to the door lock in the second aspect of the present application, a push arm is provided at one side of the main sliding block, and the push arm is able to bring the indicating sliding block to move from the closed position to the open position.

According to the door lock in the second aspect of the present application, the door lock further comprises a biasing apparatus, and the biasing apparatus pushes the indicating sliding block to move from the open position to the closed position.

According to the door lock in the second aspect of the present application, the biasing apparatus is a spring.

According to the door lock in the second aspect of the present application, the indicating sliding block comprises a stepped part, and the stepped part comprises an upper step and a lower step that are arranged by way of connection; a bearing surface and a recess are provided on the upper step, the bearing surface is arranged at a distal end of the upper step, the bearing surface is higher than the recess, a distal end of the recess is connected to the bearing surface, and an indicating sliding block restoration part is provided at an outer side face at a proximal end of the recess; an indicating sliding block release part is provided on an upper surface at a distal end of the lower step, a blocking surface is provided at a proximal end of the lower step, and the blocking surface is used for blocking the movement of the main sliding block when the main sliding block moves from the locked position to the released position; and the indicating sliding block protrusion locking claw extends out of an outer side face at the distal end of the lower step.

According to the door lock in the second aspect of the present application, the indicating sliding block restoration part comprises a restoration bevel, and the restoration bevel tilts inward in a direction from the distal end of the upper step to the proximal end; and the indicating sliding block release part comprises a rotation bevel, and the rotation bevel tilts outward in a direction from the proximal end of the lower step to the distal end.

The door lock according to the second aspect of the present application further comprises a door lock box, the door lock box comprising an indicating sliding block sliding chute, and the indicating sliding block sliding chute comprising an inside wall and an outside wall; a notch provided at a distal end of the inside wall, for accommodating the indicating sliding block protrusion locking claw, wherein a blocking surface is provided at a distal end of the notch, and the blocking surface is used for blocking the movement of the indicating sliding block when the main sliding block moves from the released position to the locked position along the first direction; and an indicating sliding block recovery bevel provided at a proximal end of the outside wall, for cooperating with the indicating sliding block restoration part to restore the indicating sliding block.

According to the door lock in the second aspect of the present application, the indicating latch can be steadily in a closed position or an open position, and it is an instantaneous jump process when the indicating latch move from the disconnected position to the closed position or from the closed position to the disconnected position, avoiding the state of semi-linkage or bad contact when a movable contact and a stationary contact are in contact.

DETAILED DESCRIPTION

Various specific implementation manners of the present application will be described below with reference to the accompanying drawings that constitute a part of this specification. It should be understood that although terms for denoting directions, such as “front”, “back”, “up”, “down”, “left”, “right”, “head”, “tail”, “proximal end”, “distal end”, are used in the present application to describe various exemplary structure parts and components of the present application, these terms are used here only for the purpose of convenient illustration and are determined based on the exemplary orientation shown in the accompanying drawings. Since the embodiments disclosed in the present application can be set in different directions, these terms that denote directions serve only as illustration and should not be regarded as restriction. Where possible, same or similar figure labels used in the present application refer to the same components.

Figure 1A:
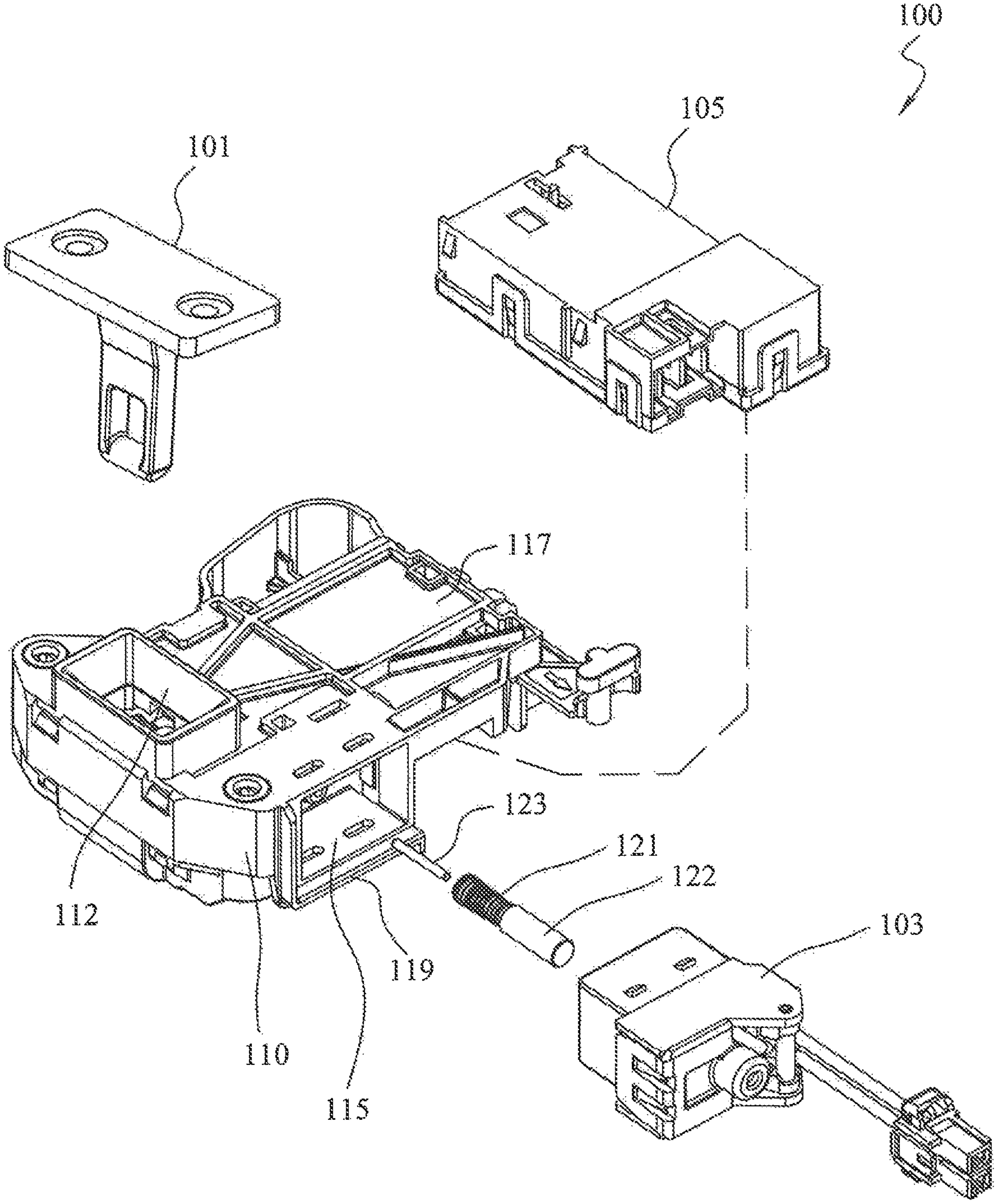
FIG. 1A is a schematic diagram of the overall structure of a door lock 100 in the present application shown from its front side, with some components of the door lock 100 shown by way of an explosive view.
Figure 1B:
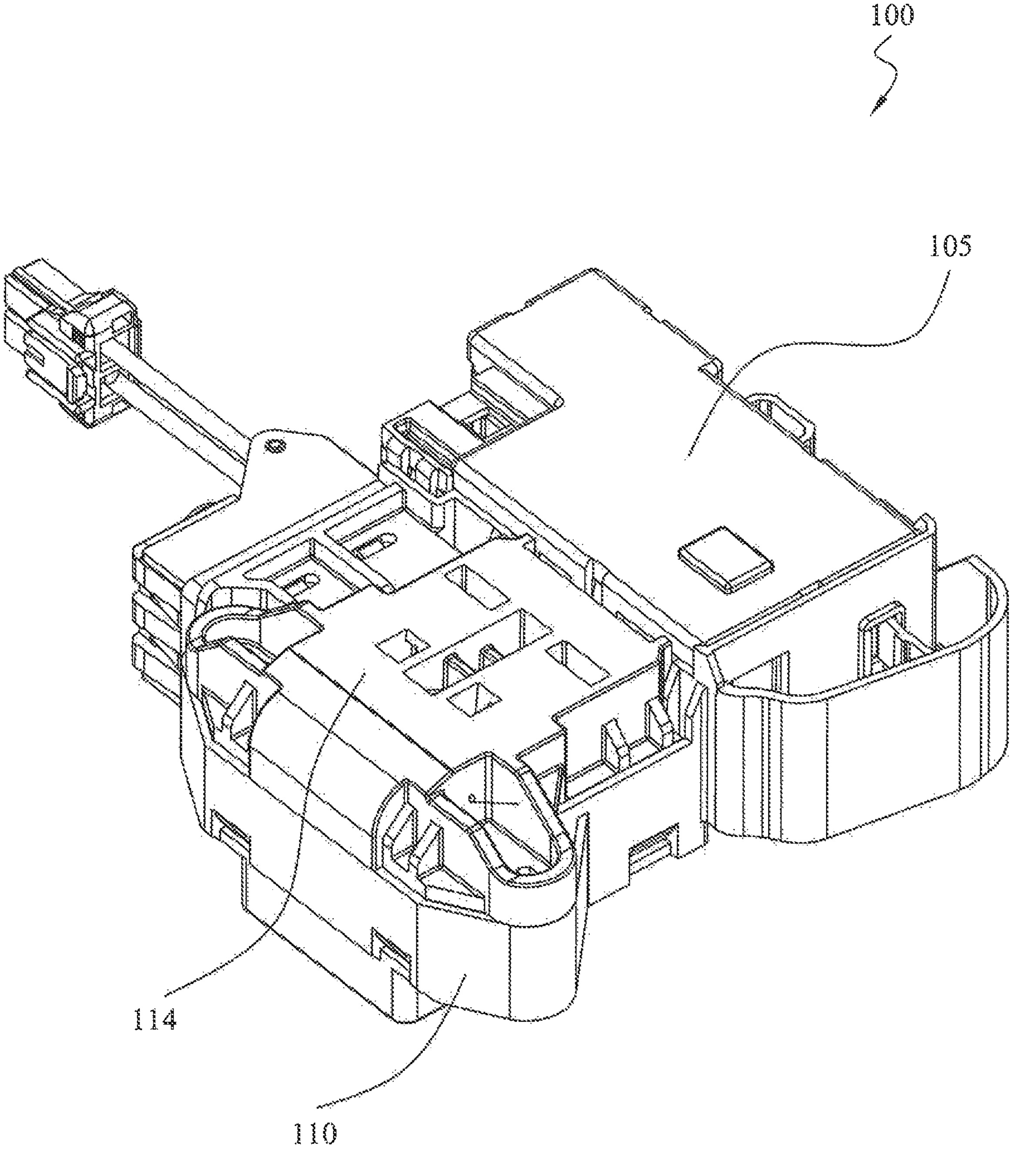
FIG. 1B is a schematic diagram of the overall structure of the door lock 100 in the present application shown from its back side.

FIG. 1A is a schematic diagram of the overall structure of a door lock 100 in the present application observed from its front side, with some components of the door lock 100 shown by way of an explosive view. FIG. 1B is a schematic diagram of the overall structure of the door lock 100 in the present application observed from its back side.

As shown in FIG. 1A, the door lock 100 includes a door lock box 110, a top cover 117 is provided at the upper part of the door lock box 110, and a door lockhole 112 is set above the head of the top cover 117 for accommodating a door hook 101. The door hook 101 is located above the door lockhole 112, and when the door hook 101 inserts, from the door lockhole 112 above the door lock box 110, into the door lock 100 and hooks a cam 201 (see FIG. 2) inside the door lock 100, and when the cam 201 is locked, the door of the electric appliance is accordingly in a position that can be locked.

In FIG. 1A, the door lock 100 further includes an actuating component 103 and a switch box 105. A bottom surface 119 is provided below the head of the top cover 117 of the door lock 100, an accommodating cavity 115 is formed between the top cover 117 and the bottom surface 119, and the actuating component 103 is accommodated in the accommodating cavity 115. The actuating component 103 is an electromagnetic drive part, in which a coil 121 and an iron core 122 as well as a contact probe 123 at the front end are provided. After the actuating component 103 receives a starting signal, the coil 121 is powered on, and the coil 121 produces an electromagnetic pushing force to the iron core 122 to push out the contact probe 123, and after the power is off, the contact probe 123 is retracted. The switch box 105 is mounted below the tail of the top cover 117. The function of the actuating component 103 is to actuate relevant components in the door lock 100, while the function of the switch box 105 includes locking or releasing the main sliding block 204 and connecting or disconnecting the main circuit that controls the door lock 100.

As shown in FIG. 1B, a chassis 114 is provided below the head of the top cover 117, while the switch box 105 is provided below the tail of the top cover 117, and the chassis 114 and the switch box 105 are arranged next to each other in the width direction of the door lock box 110 on the surface below the top cover 117.

Figure 2:
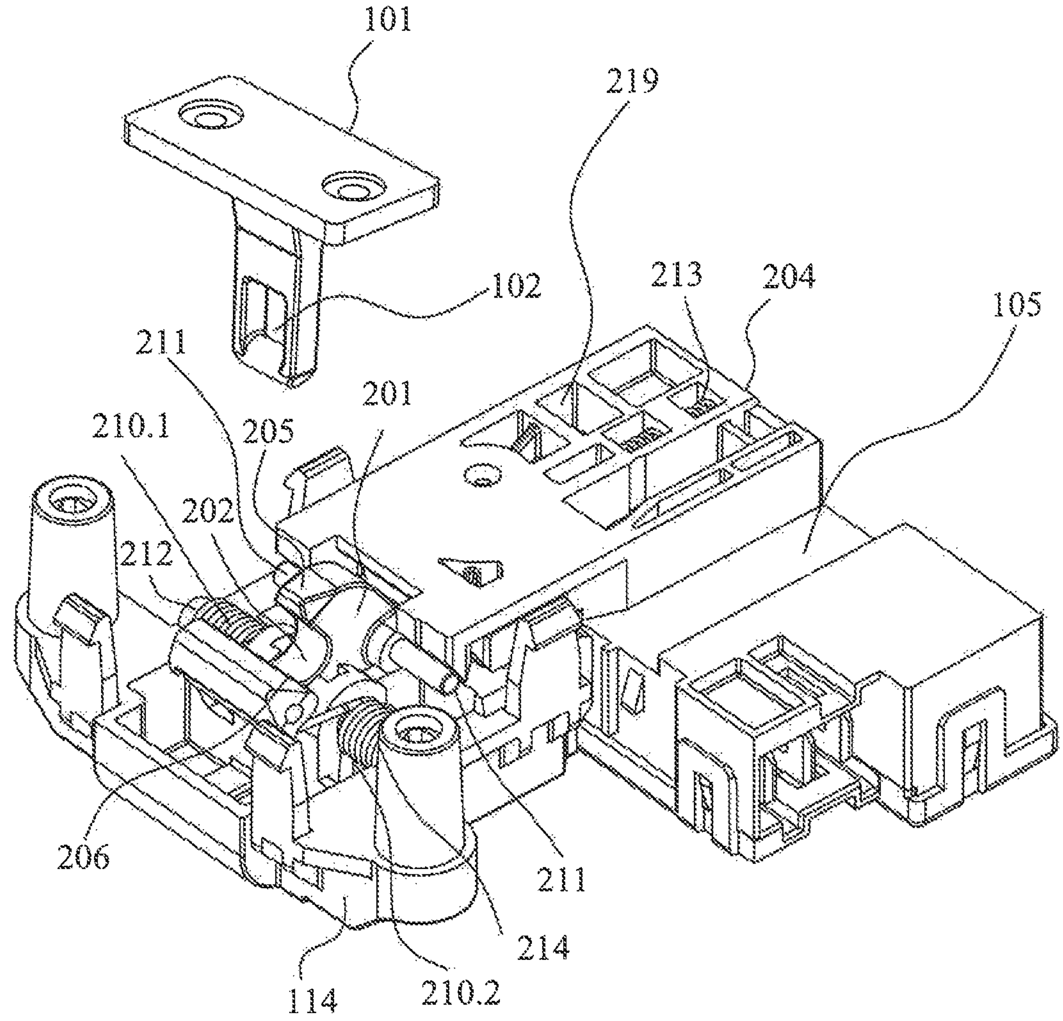
FIG. 2 is a schematic diagram of the structure of the door lock 100 in FIG. 1A after a top cover 117 is cut off and an actuator 103 is taken away.

FIG. 2 is a schematic diagram of the structure of the door lock 100 in FIG. 1A after the top cover 117 is cut off and the actuating component 103 is taken away, for more particularly showing the components in the chassis 114, the switch box 105 and the main sliding block 204, and the relationship among the chassis 114, the switch box 105 and the main sliding block 204.

In FIG. 2, the chassis 114 and the switch box 105 are arranged side by side in the width direction of the door lock box 110 on the surface below the top cover 117. The main sliding block 204 is arranged between the top cover 117 and the switch box 105 and stretches across the chassis 114 and the switch box 105 in the width direction of the door lock box 110, and the left end (distal end) of the main sliding block 204 can cover the part above the chassis 114. A lockhole 219 is provided on the main sliding block 204, and when the main sliding block 204 is at the locked position and a locking dog (not shown) in the switch box 105 extends out of the lockhole 219, the main sliding block 204 is locked, and thus the electric door is also locked.

As shown in FIG. 2, a cam 201 is provided on the chassis 114, the cam 201 is arranged below the door hook 101, the main body of the cam 201 is of a crescent curved structure and is provided with an open slot 202 of circular arc shape, and an upper end of the open slot 202 is a hook 205. After being inserted in the door lockhole 112 (see FIG. 1), the door hook 101 pushes the cam 201 to rotate, and the rotation of the cam 201 makes the hook 205 insert in the hole 102 of the door hook 101 and hook the door hook 101. A lower end 206 of the open slot 202 contacts the front end of the door hook 101, and when the door hook 101 is inserted, the front end of the door hook 101 presses against the lower end 206 of the open slot 202, so as to push the cam 201 to rotate anticlockwise.

The cam 201 is fixated on the chassis 114 via circular shafts 212 and 214 at two sides, such that the cam 201 is enabled to rotate around the circular shafts 212 and 214. The torsional spring includes torsional springs 210.1 and 210.2, the torsional springs 210.1 and 210.2 respectively sleeve the circular shafts 212 and 214, and the torsional springs 210.1 and 210.2 provide a torsion for resetting the cam 201. When the door hook 101 is pulled out from the cam 201, the torsional springs 210.1 and 210.2 bring the cam 201 to rotate clockwise. A cam latch 211 is also provided at two sides of the tail end of the cam 201, and the cam latch 211 abuts against the left end (distal end) of the main sliding block 204. Meanwhile, the torsional springs 210.1 and 210.2 provide a biasing force for opening the door, that is, when the cam 201 and the main sliding block 204 are at the released position, the torsional spring 210 ejects the door hook 101 out of the cam 201.

FIG. 2 shows the front end of the main sliding block 204, a reset spring 213 is provided at the right end (proximal end) of the main sliding block 204, the torsion of the torsional springs 210.1 and 210.2 on the cam 201 is greater than the elastic force of the reset spring 213 on the main sliding block 204, and therefore, when the cam 201 rotates clockwise, the cam 201 is able to push the main sliding block 204 to move from the locked position to the released position. Due to the mutual effect of the reset spring 213 and the torsional springs 210.1 and 210.2, when the cam 201 rotates, the main sliding block 204 moves to and fro along with it. Particularly, the reset spring 213 provides a pretightening force for the main sliding block 204 to abut against the cam latch 211 on the cam 201, while the torsional springs 210.1 and 210.2 provide a pushing force for the cam 201 to rotate clockwise. Due to the mutual effect of the torsional springs 210.1 and 210.2 and the reset spring 213, when the cam 201 rotates clockwise and anticlockwise, the contact between the back end of the cam 201 and the main sliding block 204 makes the main sliding block 204 produce corresponding reciprocating movement. More particularly, when the door hook 101 is inserted in the cam 201, the cam 201 rotates anticlockwise, and under the action of the reset spring 213, the main sliding block 204 moves from the released position thereof to the locked position thereof (moving to the left); and when the door hook 101 is pulled out of the cam 201, the cam 201 rotates clockwise, the cam latch 211 on the cam 201 pushes the main sliding block 204 to overcome the acting force of the reset spring 213, and the main sliding block 204 moves from the locked position thereof to the released position thereof (moving to the right).

Figure 3A:
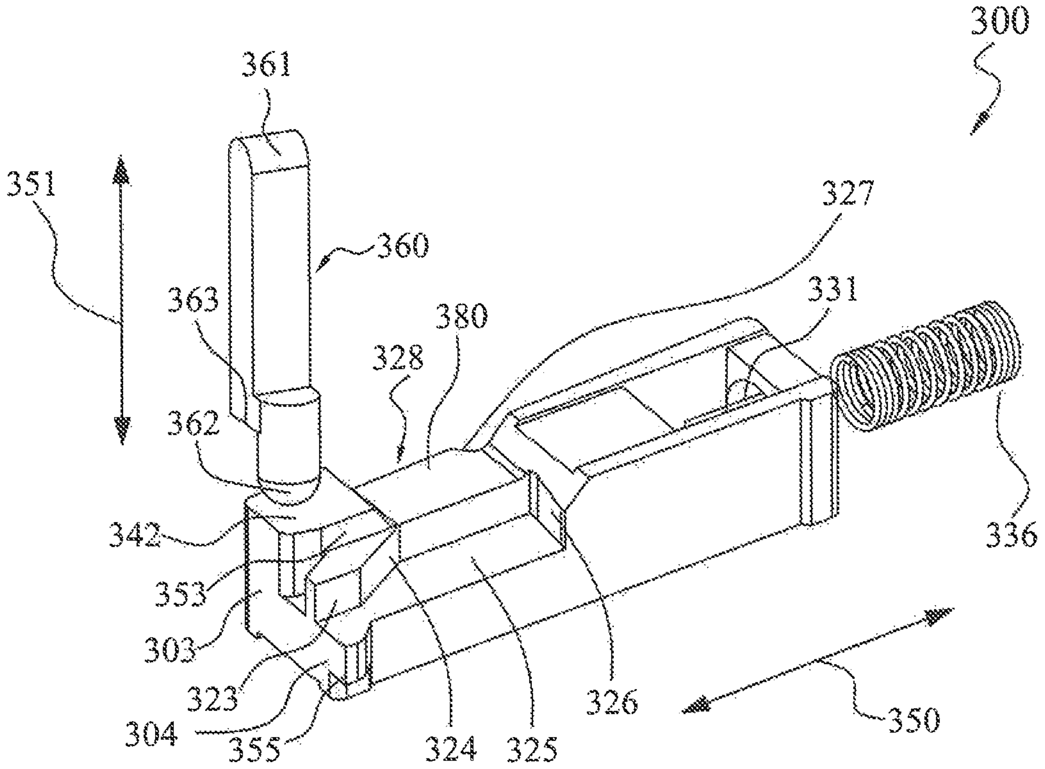
FIG. 3A and FIG. 3B are respectively a structural stereogram and a plan view of an indicating sliding block 300 of the present invention.
Figure 3B:
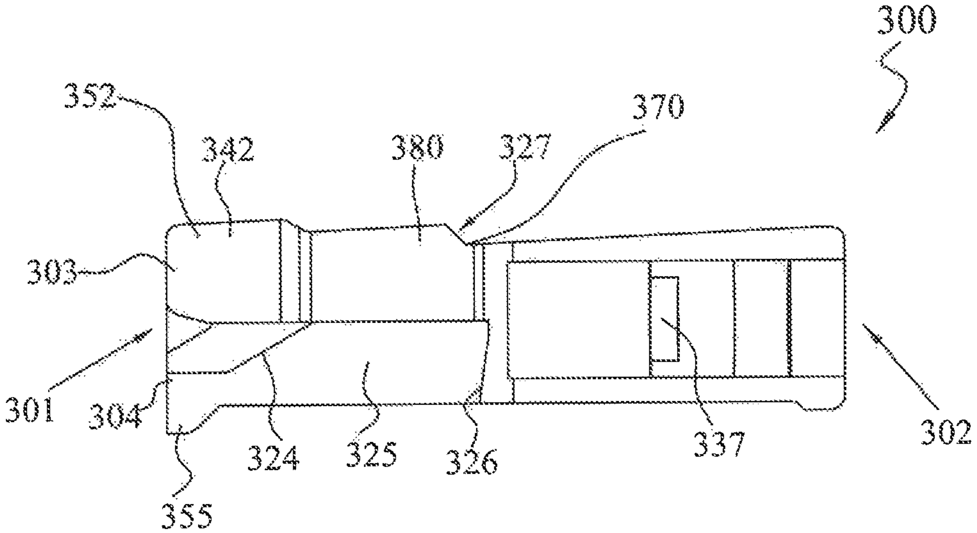

FIG. 3A and FIG. 3B are respectively a structural stereogram and a plan view of an indicating sliding block 300 of the present invention. As shown in FIG. 3A and FIG. 3B, the indicating sliding block 300 is approximately a rectangular structure and can be divided into a distal end (left end) part 301 and a proximal end (right end) part 302. The distal end of the indicating sliding block 300 is in a stepped form, with a first side (outer side) of the distal end part 301 being an upper step 303 and a second side (inner side) of the distal end part 301 being a lower step 304.

A bearing surface 342 and a recess 328 are provided on the upper step 303, the bearing surface 342 is arranged at a distal end (left end) part 352 of the upper step 303, the bearing surface 342 is higher than the recess 328, the distal end (left end) of the recess 328 is connected to the bearing surface 342, an indicating sliding block restoration part 327 is provided on the outer side face at the proximal end (right end) of the recess 328, the indicating sliding block restoration part 327 includes a restoration bevel 370, and the restoration bevel 370 tilts inward toward the proximal end direction of the recess 328. An indicating sliding block release part 323 is provided at a distal end (left end) of the upper surface 325 of the lower step 304, the indicating sliding block release part 323 includes a rotation bevel 324, and the rotation bevel 324 tilts outward toward the distal end of the recess; and the inner side face 353 of the distal end part 352 of the upper step 303 is connected to the indicating sliding block release part 323, and the indicating sliding block release part 323 protrudes at the inner side face 353. A blocking surface 326 is provided at the proximal end of the lower step 304, and the blocking surface 326 is used so that the main sliding block 204 can bring the indicating sliding block 300 to move when the main sliding block 204 moves from the locked position to the released position. An indicating sliding block protrusion locking claw 355 extends out of an outer side face at the distal end (left end) of the lower step 304. A through-hole 331 and a registration mast 337 are provided at the tail on the proximal end (right end) part 302 of the indicating sliding block 300, for mounting a biasing apparatus 336 (e.g. a spring) on the indicating sliding block 300.

In addition, FIG. 3A also shows an indicating latch 360. The indicating latch 360 has a tail 361, a head 362 and a shoulder 363. The head 362 of the indicating latch 360 is slidably supported on the bearing surface 342 of the upper step 303 and on the surface 380 of the recess 328, and the indicating latch 360 cannot move along the length direction (first direction, i.e. the direction shown by arrow 350) of the indicating sliding block 300, but the relative movement between the indicating latch 360 and the indicating sliding block 300 can enable the indicating latch 360 to move up and down along the direction (second direction) shown by arrow 351, where the second direction and the first direction are perpendicular to each other. When the indicating latch 360 is located in the recess 328 (closed position), the tail 361 of the indicating latch 360 can close the switching apparatus in the door lock 100 (see FIG. 7A); and when the indicating latch 360 is located on the bearing surface 342 (disconnected position), the tail 361 of the indicating latch 360 can disconnect the switching apparatus in the door lock 100 (see FIG. 7B).

Figure 4A:
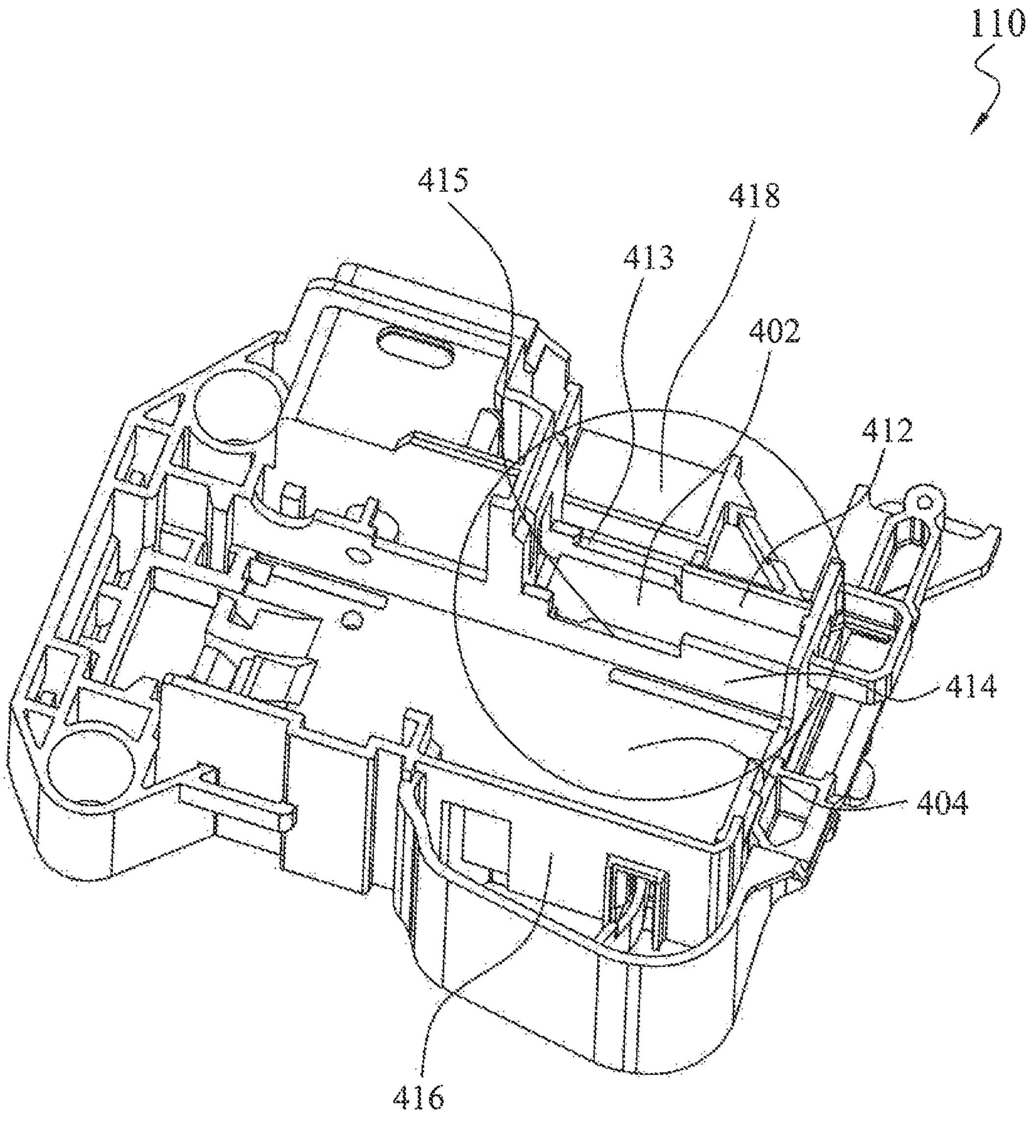
FIG. 4A is a schematic diagram of the interior structure of a door lock box 110 in FIG. 2 with all components in the door lock box 110 removed.

FIG. 4A is a schematic diagram of the interior structure of a door lock box 110 in FIG. 2 with all components in the door lock box 110 removed. As shown in FIG. 4A, the door lock box 110 includes an indicating sliding block sliding chute 402 and a main sliding block sliding chute 404. The indicating sliding block sliding chute 402 has an outside wall 412 and an inside wall 414, and the main sliding block sliding chute 404 has an outside wall 414 (a wall that is shared with the inside wall 414 of the indicating sliding block sliding chute 402) and an outside wall 416. A groove 413 is provided at the distal end part of the outside wall 412 of the indicating sliding block sliding chute 402, and a groove 415 is provided at the distal end part of the inside wall 414 of the indicating sliding block sliding chute 402. The indicating sliding block sliding chute 402 is used for accommodating the indicating sliding block 300, while the main sliding block sliding chute 404 is used for accommodating the main sliding block 204. The door lock box 110 further includes a support frame 418, to facilitate the support of the indicating latch 360 while the indicating latch 360 slides.

Figure 4B:
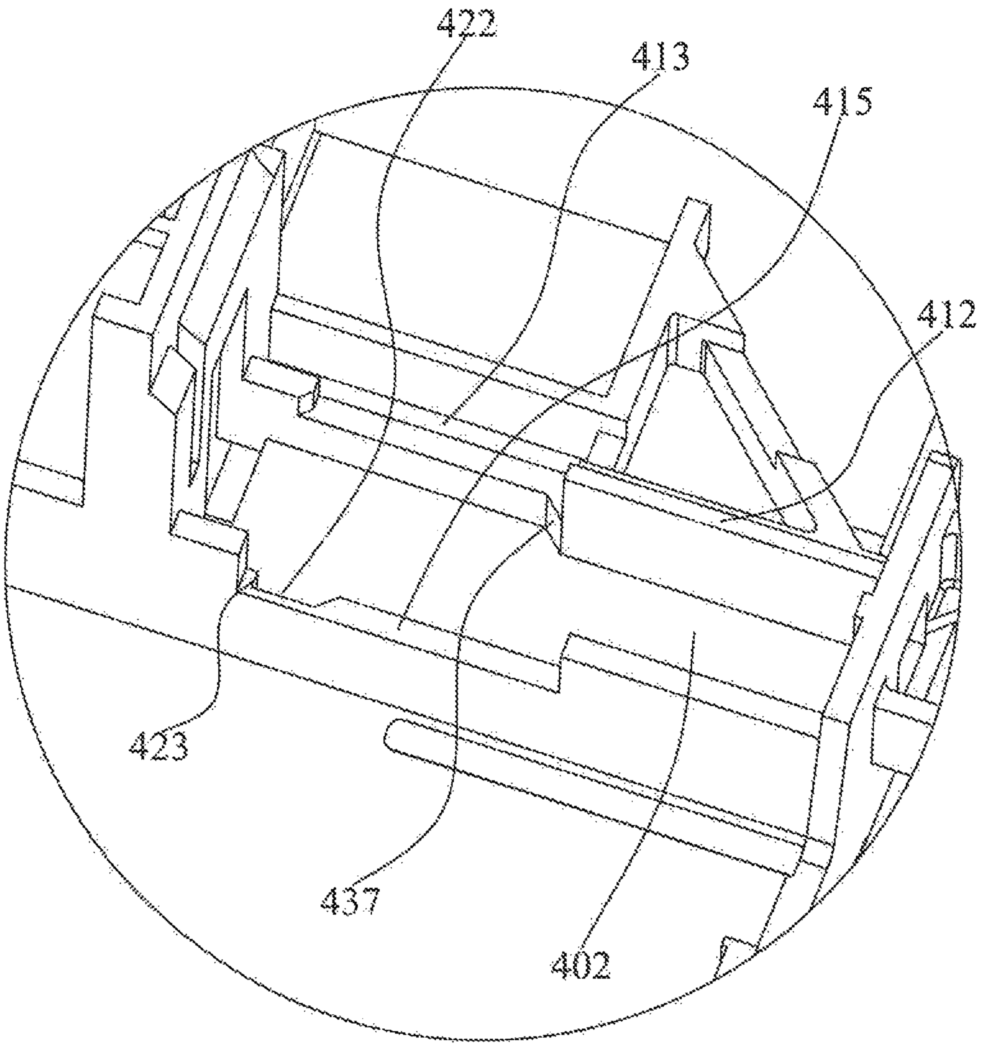
FIG. 4B is a partial enlarged drawing of the part 403 in FIG. 4A.

FIG. 4B is a partial enlarged drawing of the part 403 in FIG. 4A, for showing the structure of the indicating sliding block sliding chute 402 more clearly. As shown in FIG. 4B, a groove 413 is provided at the distal end part of the outside wall 412 of the indicating sliding block sliding chute 402, and a groove 415 is provided at the distal end part of the inside wall 414 of the indicating sliding block sliding chute 402. An indicating sliding block recovery bevel 437 is provided below the inner side face at the distal end of the groove 413 on the outside wall 412, and the indicating sliding block recovery bevel 437 tilts outward in the proximal end (right end) direction of the groove 415. A notch 422 is provided below the outer side face at the distal end part (left side) of the groove 415 on the inside wall 414, and a blocking surface 423 is provided at the distal end part (left end part) of the notch 422.

Figure 5A:
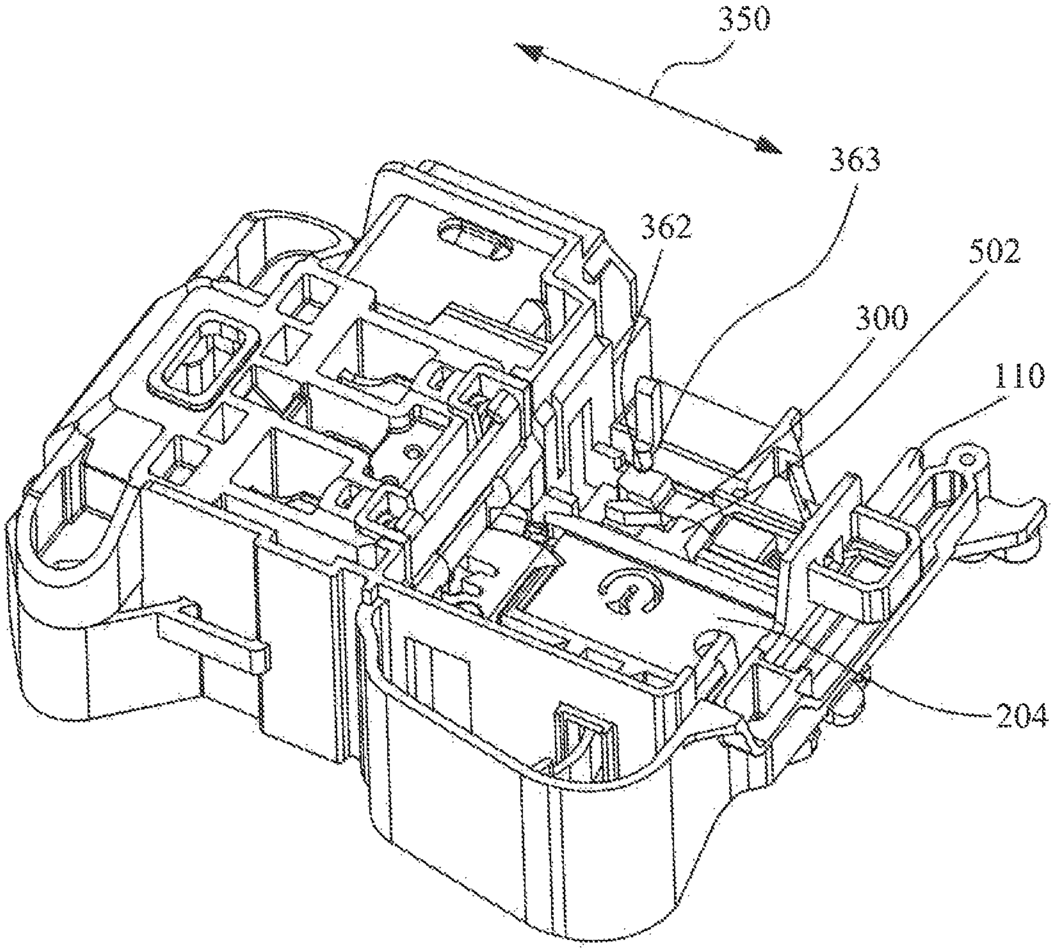
FIG. 5A is a stereoscopic schematic diagram showing the installation of a main sliding block 204 and an indicating sliding block 300 in the door lock box 110.
Figure 5B:
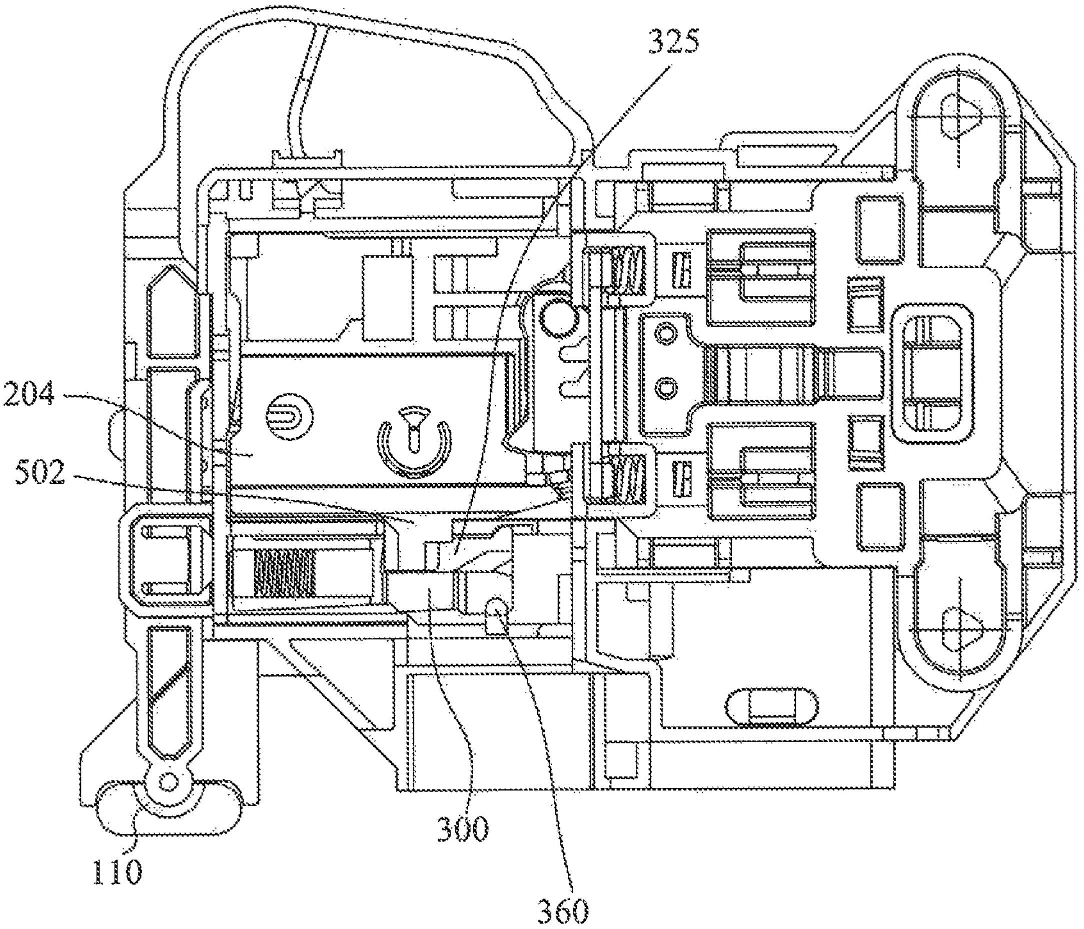
FIG. 5B is a schematic plan showing the installation of the main sliding block 204 and the indicating sliding block 300 in the door lock box 110.

FIG. 5A is a stereoscopic schematic diagram showing the installation of a main sliding block 204 and an indicating sliding block 300 in the door lock box 110. FIG. 5B is a schematic plan showing the installation of the main sliding block 204 and the indicating sliding block 300 in the door lock box 110. As shown in FIG. 5A and FIG. 5B, the indicating sliding block 300 is mounted in the indicating sliding block sliding chute 402, and the indicating sliding block 300 can slide to and fro in the indicating sliding block sliding chute 402; while the main sliding block 204 is mounted in the main sliding block sliding chute 404, and the main sliding block 204 can slide to and fro in the main sliding block sliding chute 404. A push arm 502 is provided at the side face of the main sliding block 204, and the push arm 502 is slidably placed on the upper surface 325 of the lower step 304 in the indicating sliding block 300, for bringing the indicating sliding block 300 to move when the main sliding block 204 moves from the locked position to the released position thereof. The head 362 of the indicating latch 360 is slidably arranged above the indicating sliding block 300, to enable the indicating sliding block 300 to steadily move to and fro in the length direction (first direction, i.e. the direction shown by arrow 350) of the indicating sliding block 300.

Figure 6A:
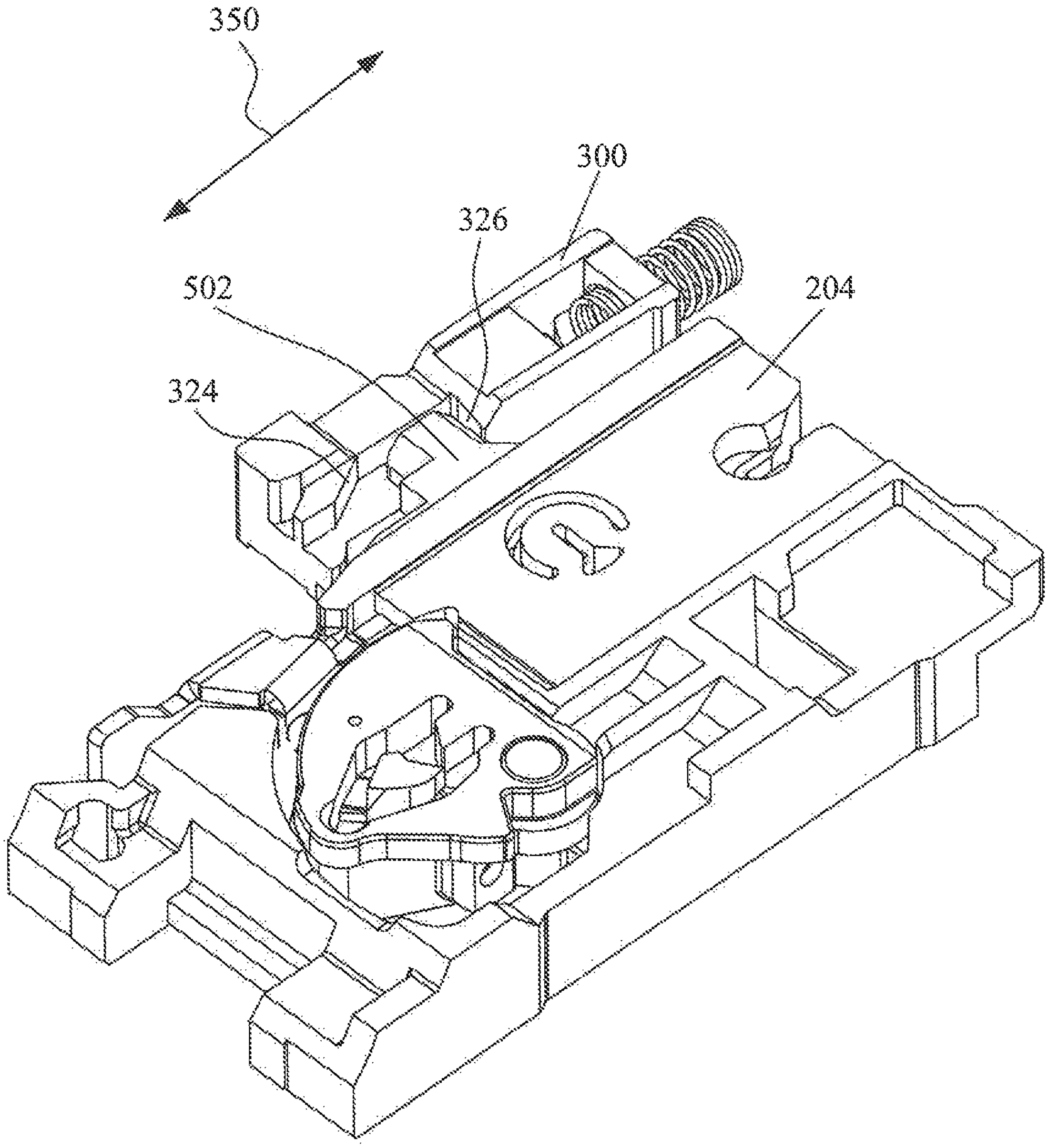
FIG. 6A and FIG. 6B are an assembly stereogram and an assembly explosive view of the main sliding block 204 and the indicating sliding block 300.
Figure 6B:
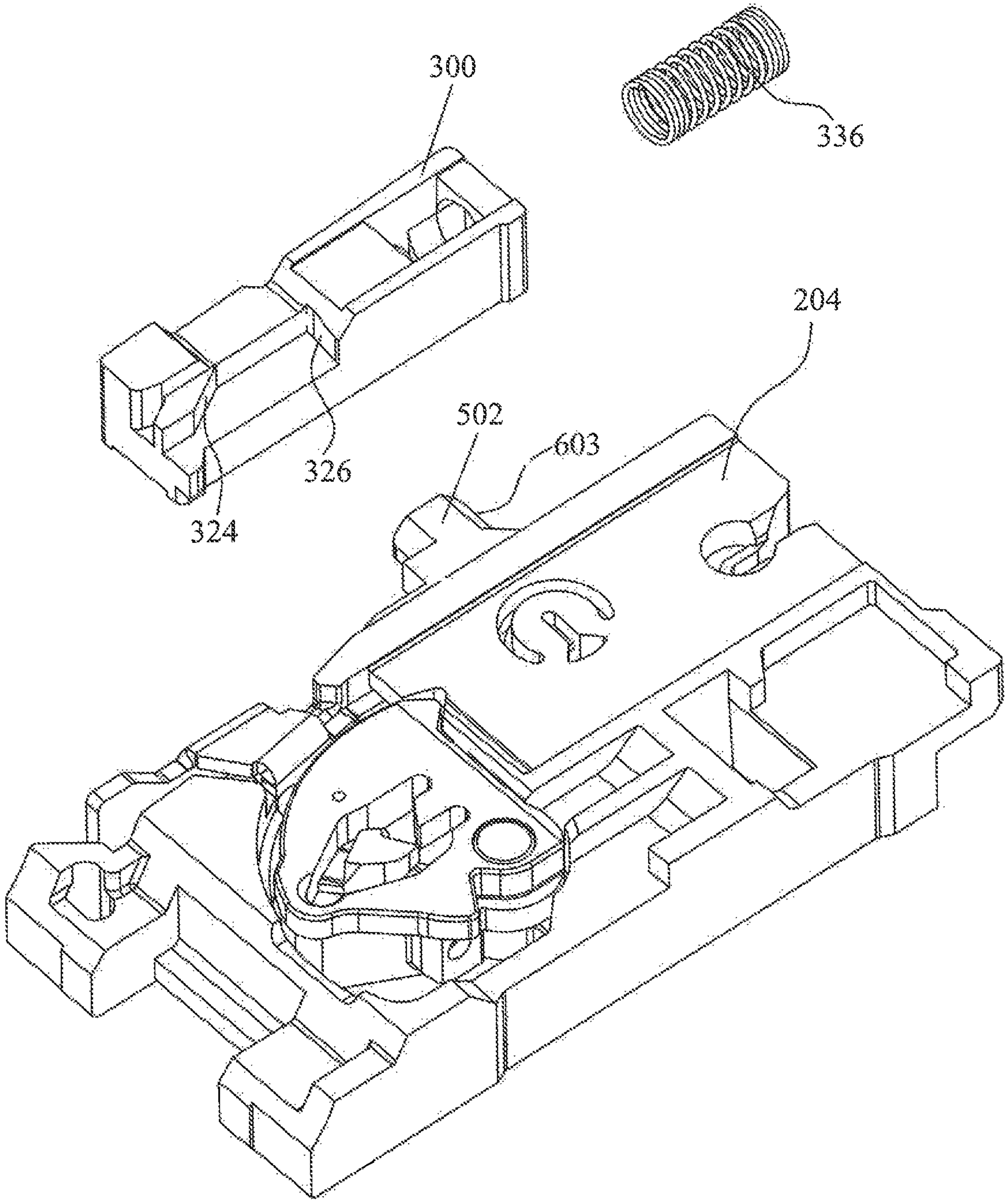
Figure 6C:
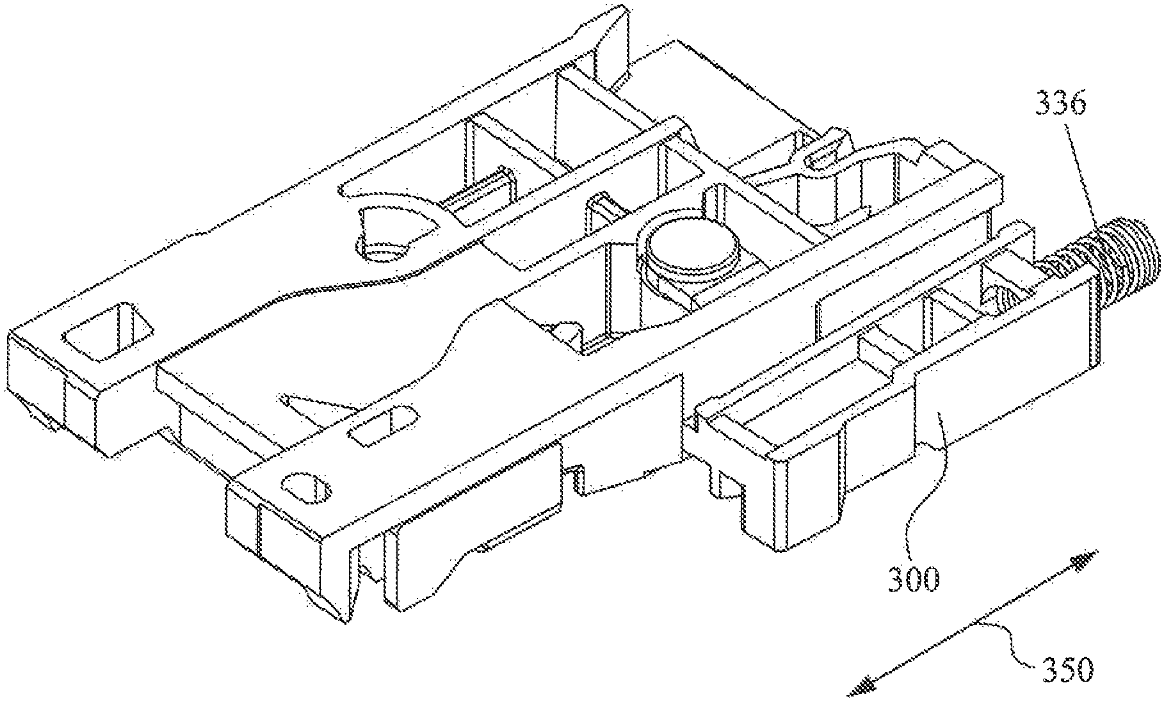
FIG. 6C and FIG. 6D are an assembly stereogram and an assembly explosive view of the main sliding block 204 and the indicating sliding block 300 shown from the back sides thereof.
Figure 6D:
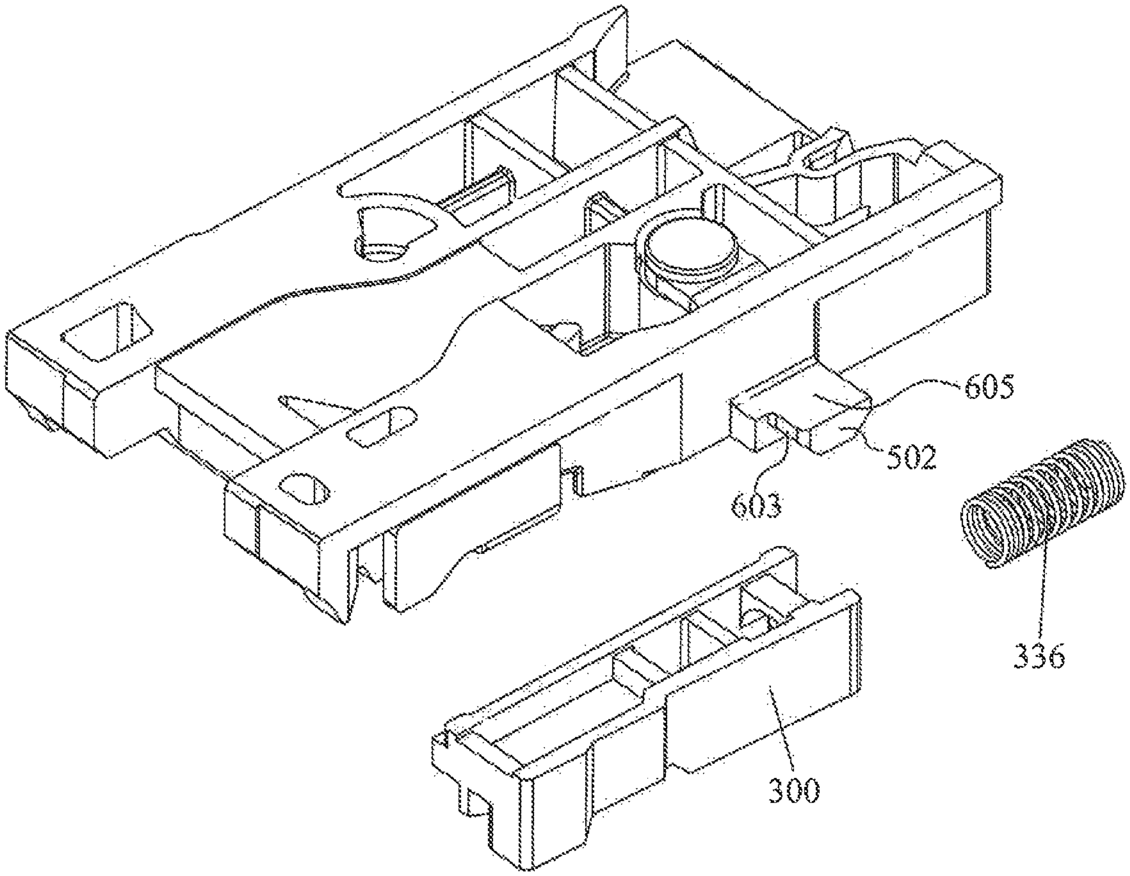

FIG. 6A and FIG. 6B are an assembly stereogram and an assembly explosive view of the main sliding block 204 and the indicating sliding block 300, in which FIG. 6A and FIG. 6B are the assembly stereogram and the assembly explosive view of the main sliding block 204 and the indicating sliding block 300 shown from the front sides thereof; and FIG. 6C and FIG. 6D are the assembly stereogram and the assembly explosive view of the main sliding block 204 and the indicating sliding block 300 shown from the back sides thereof, for more clearly showing the cooperative relationship between the main sliding block 204 and the indicating sliding block 300 and the shape details of the push arm 502.

As shown in FIG. 6A to FIG. 6D, the push arm 502 has a side part 603 and a flat bottom 605. When the main sliding block 204 moves from the locked position to the released position along the length direction (first direction, i.e. the direction shown by arrow 350) thereof, the side part 603 thereof presses against the blocking surface 326 of the indicating sliding block 300, so as to bring the indicating sliding block 300 to move from the closed position to the open position along the length direction (first direction) thereof. When the main sliding block 204 moves from the released position to the locked position along the length direction (first direction) thereof, the biasing force from the spring 336 moves the indicating sliding block 300 from the open position to the closed position.

Referring to FIG. 6A to FIG. 6D, when the push arm 502 of the main sliding block 204 moves from the released position to the locked position and passes by the rotation bevel 324 of the indicating sliding block 300, a component force produced on the rotation bevel 324 will rotate the indicating sliding block 300 by an angle (e.g. 2.0-2.5 degrees), so that an included angle (see FIG. 8C and FIG. 8D) is formed between the indicating sliding block 300 and the length direction (first direction) of the main sliding block 204. When the push arm 502 moves from the locked position to the released position, and when the restoration bevel 370 on the indicating sliding block 300 passes by the indicating sliding block recovery bevel 437 on the indicating sliding block sliding chute 402, the component force produced as a result of the mutual effect of the two bevels will rotate the indicating sliding bevel 300 by an angle to the opposite direction (rotate reversely by 2.0-2.5 degrees), so that the indicating sliding block 300 returns to the position parallel to the length direction (first direction) of the main sliding block 204 (see FIG. 8F and FIG. 8G).

Figure 7A:
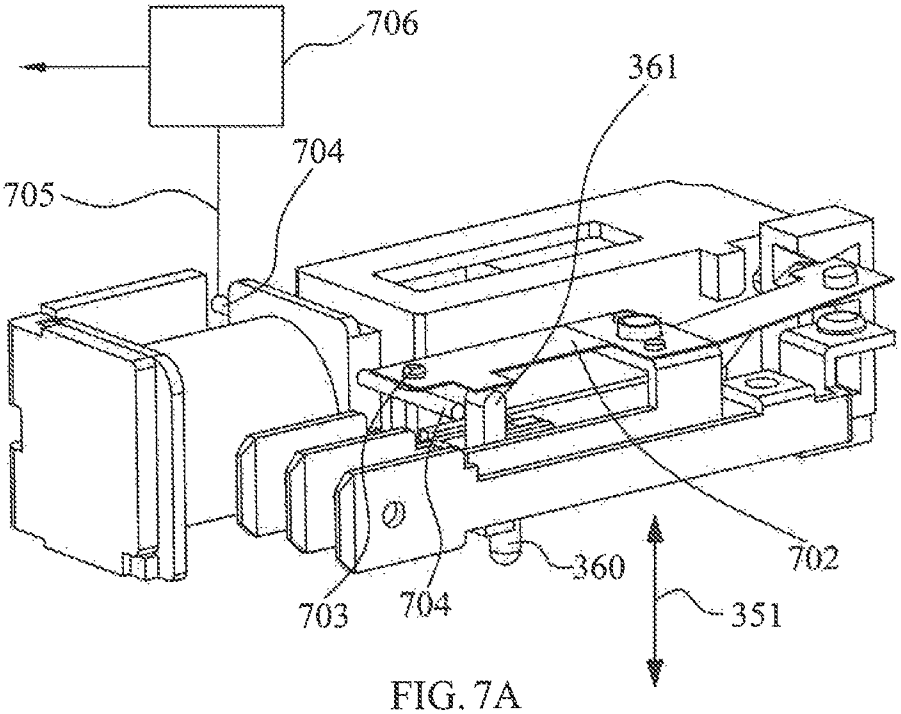
FIG. 7A and FIG. 7B are schematic structural diagrams of the components located above the indicating sliding block 300 in the indicating sliding block sliding chute 402 in FIG. 4A and FIG. 4B.
Figure 7B:
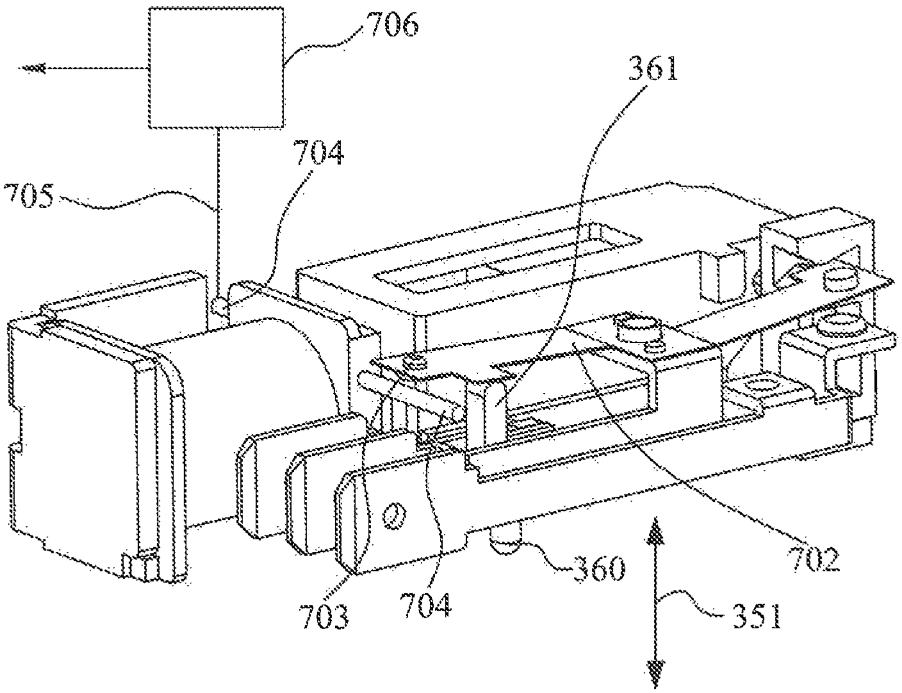

FIG. 7A and FIG. 7B show the components located above the indicating sliding block 300 in the indicating sliding block sliding chute 402 in FIG. 4A and FIG. 4B, for showing how the indicating latch 360 closes and disconnects the switching apparatus. As shown in FIG. 7A and FIG. 7B, the switching apparatus includes a movable spring piece 702, a movable contact 703 arranged on the movable spring piece 702 and a fixed conductor rod 704. As shown in FIG. 7A, after the indicating latch 360 moves downward for a certain distance, the tail 361 of the indicating latch 360 leaves the movable spring piece 702, so that the movable contact 703 contacts the fixed conductor rod 704 to connect the power circuit. As shown in FIG. 7B, after the indicating latch 360 moves upward for a certain distance, the tail 361 of the indicating latch 360 props up the movable spring piece 702, so that the movable contact 703 leaves the fixed conductor rod 704 to disconnect the power circuit.

As shown in FIG. 7A and FIG. 7B, the input 705 of the indicating apparatus 706 is electrically connected to the fixed conductor rod 704, and when the power circuit is connected, the indicating apparatus 706 outputs a first state signal (e.g. high level or low level), indicating that the door lock 100 is in the locked state; and when the power circuit is disconnected, the indicating apparatus 706 outputs a second state signal (e.g. low level or high level), indicating that the door lock 100 is in the released state.

Figure 8A:
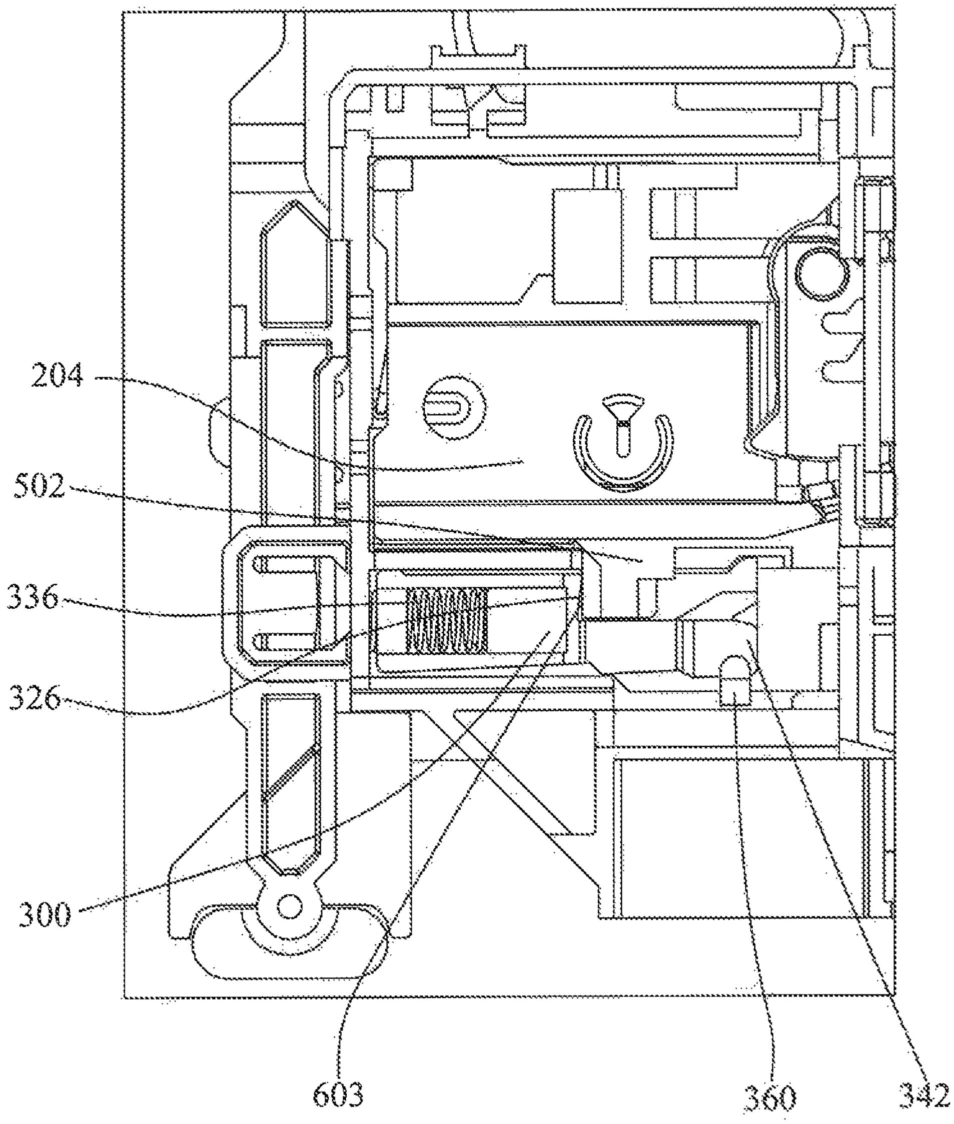
FIG. 8A to FIG. 8G are operational process drawings about the cooperation of relevant components in the door lock 100 of the present application.
Figure 8B:
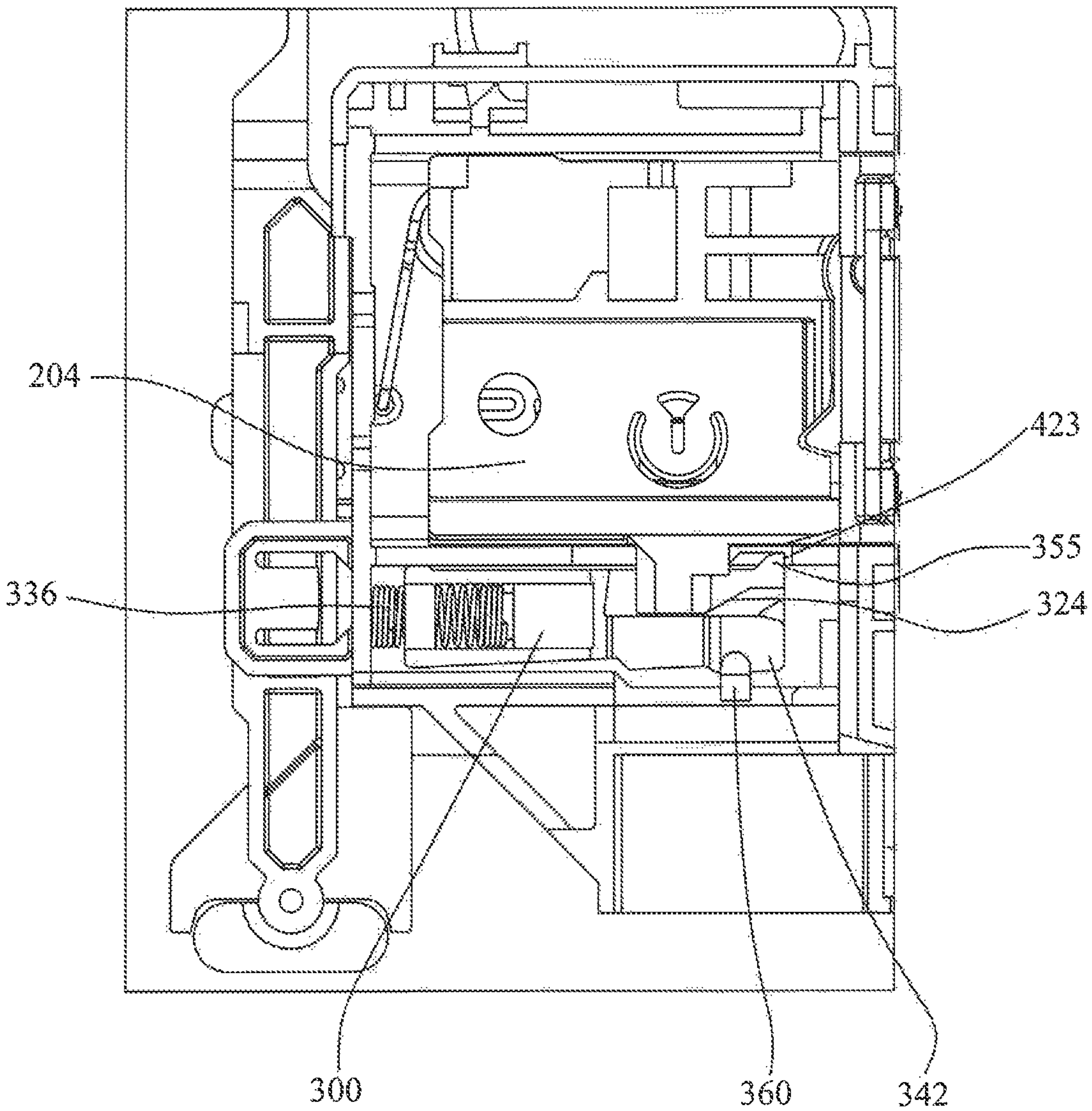
Figure 8C:
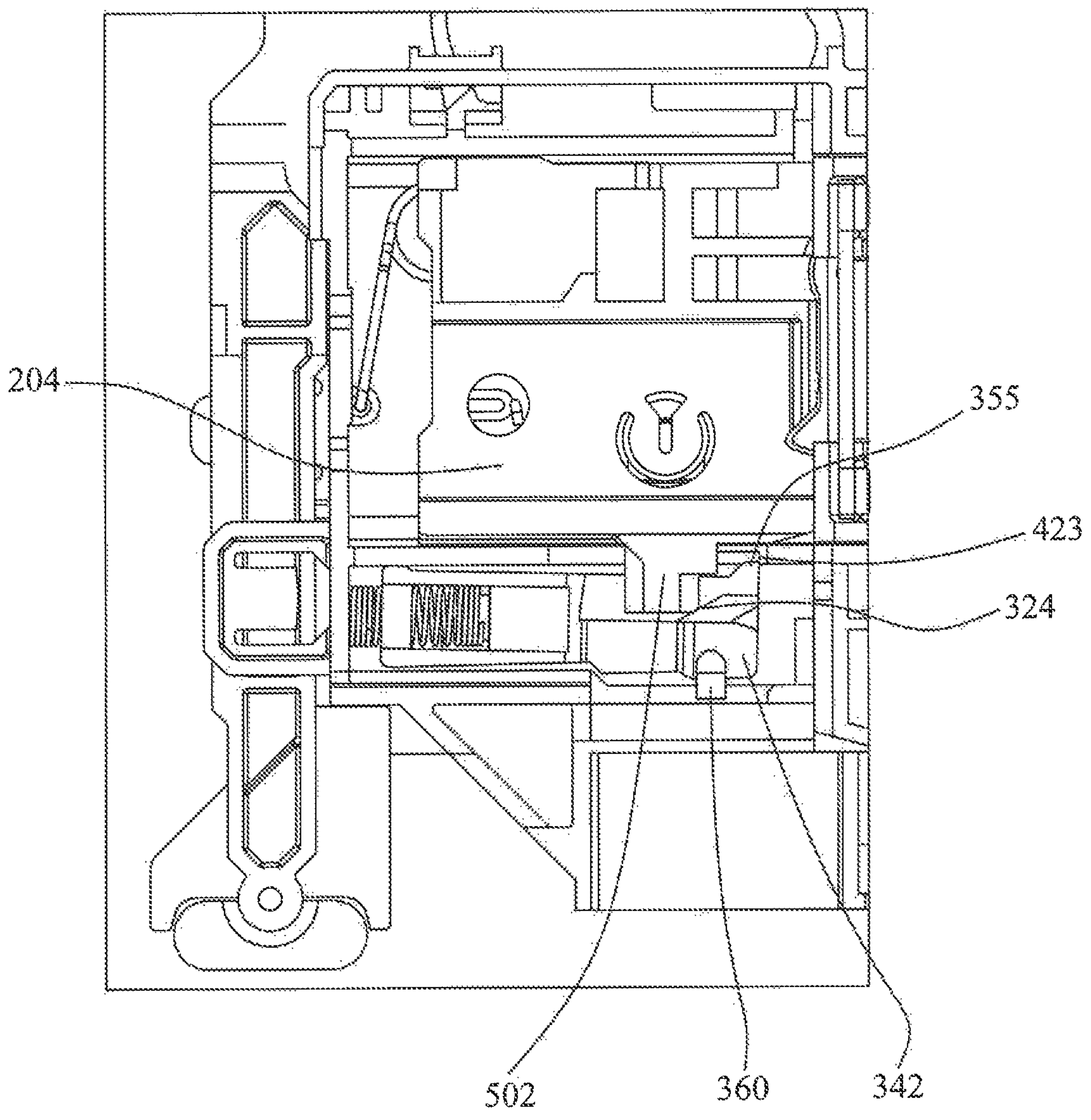
Figure 8D:
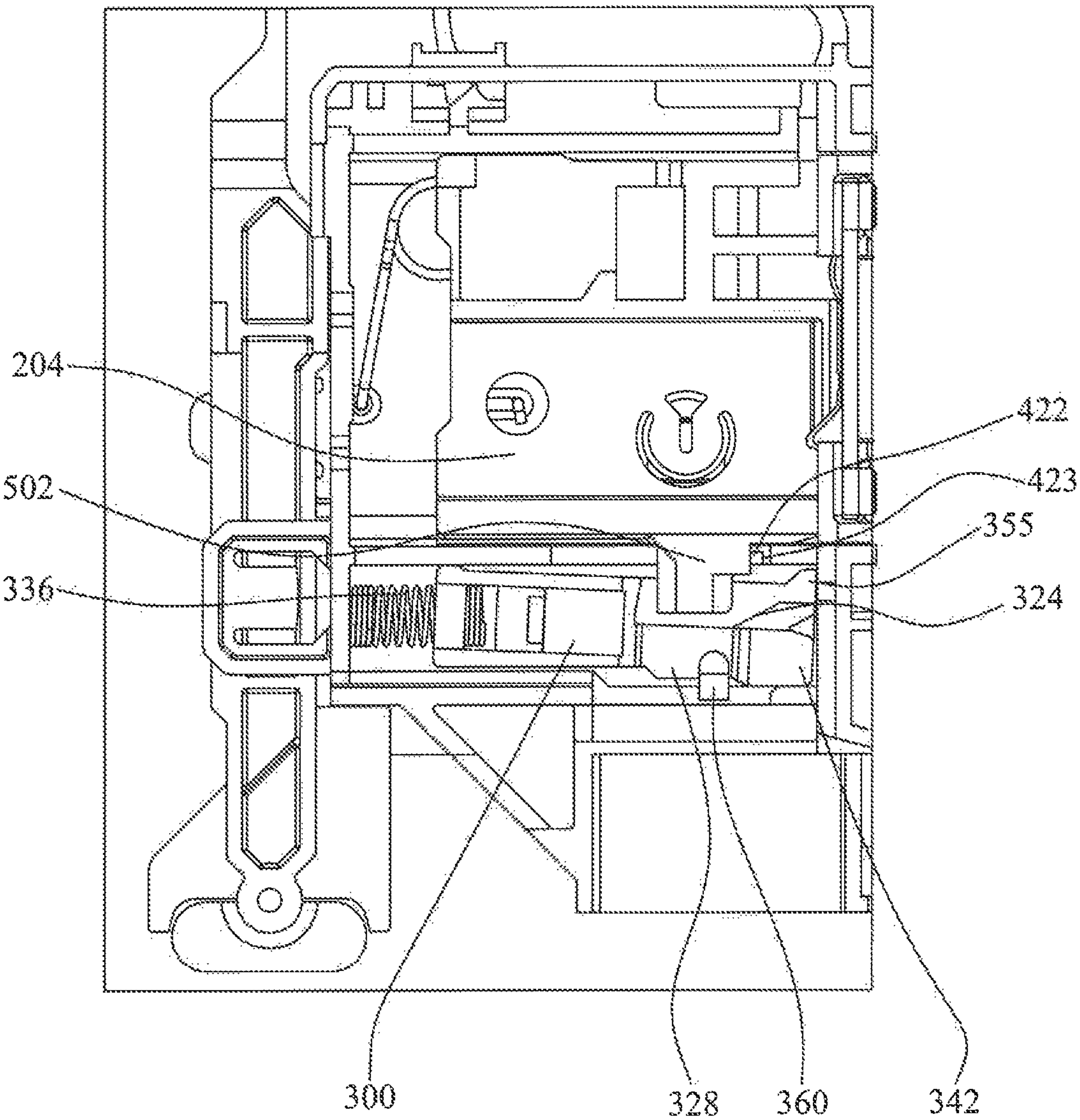
Figure 8E:
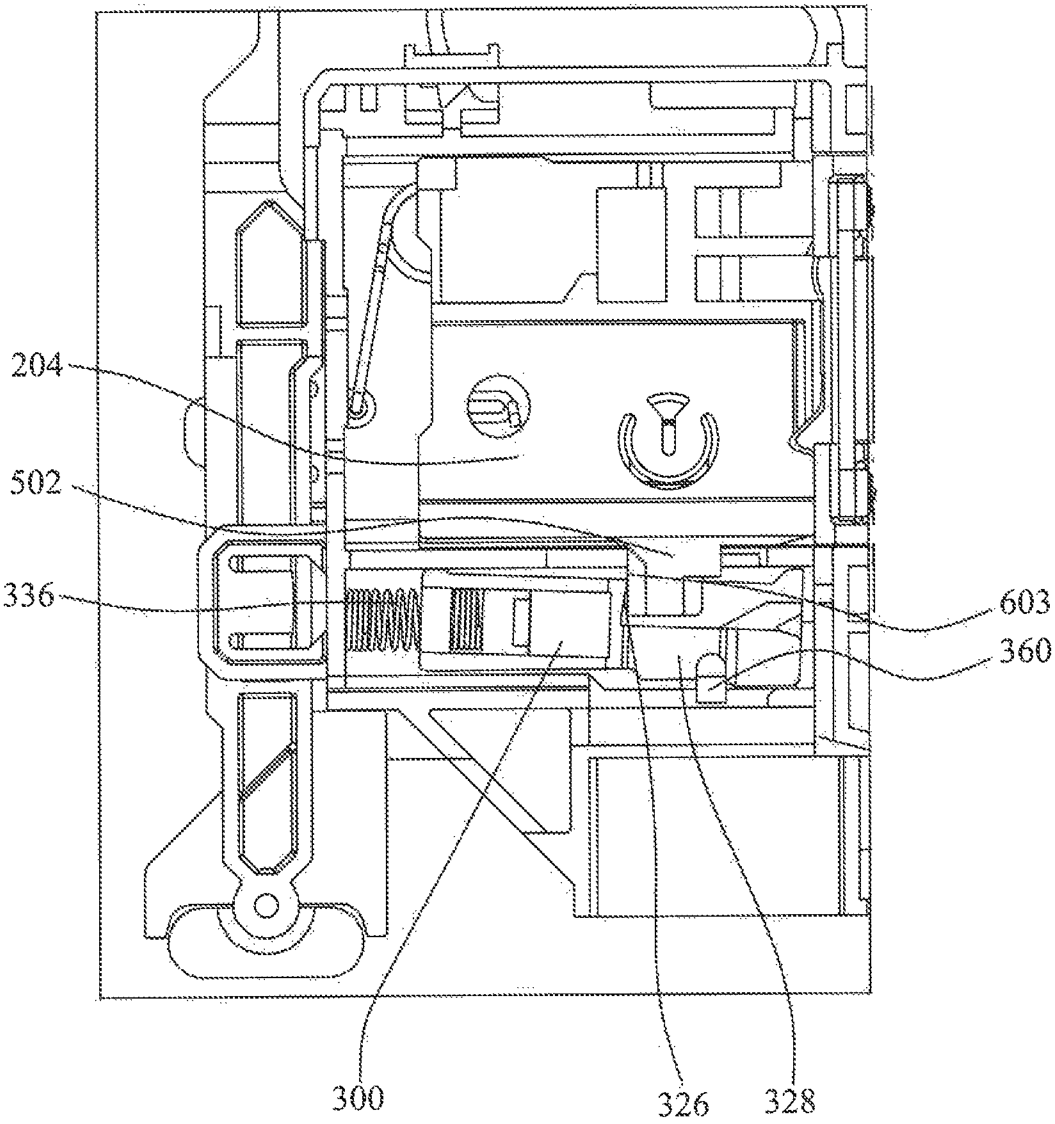
Figure 8F:
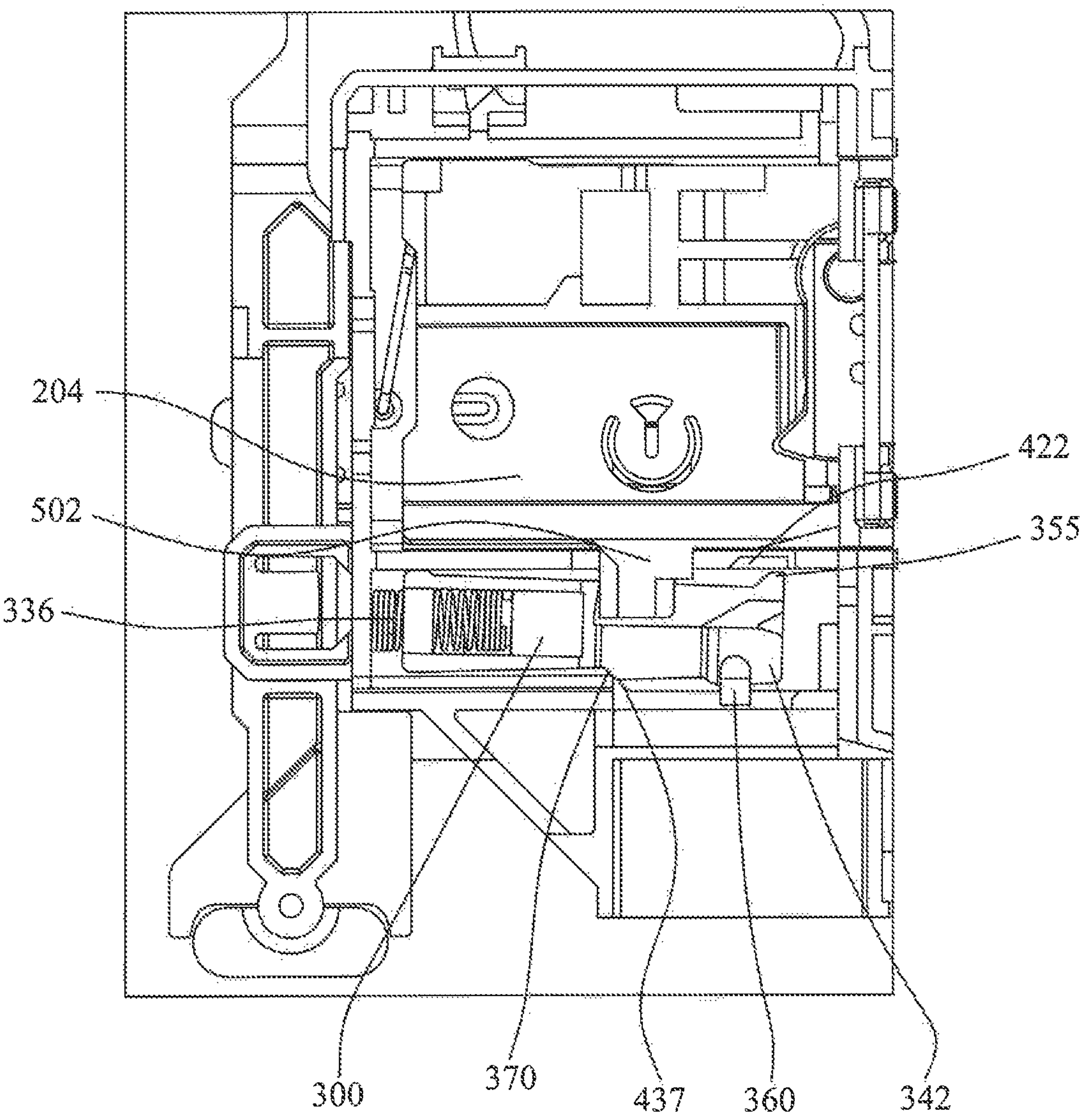
Figure 8G:
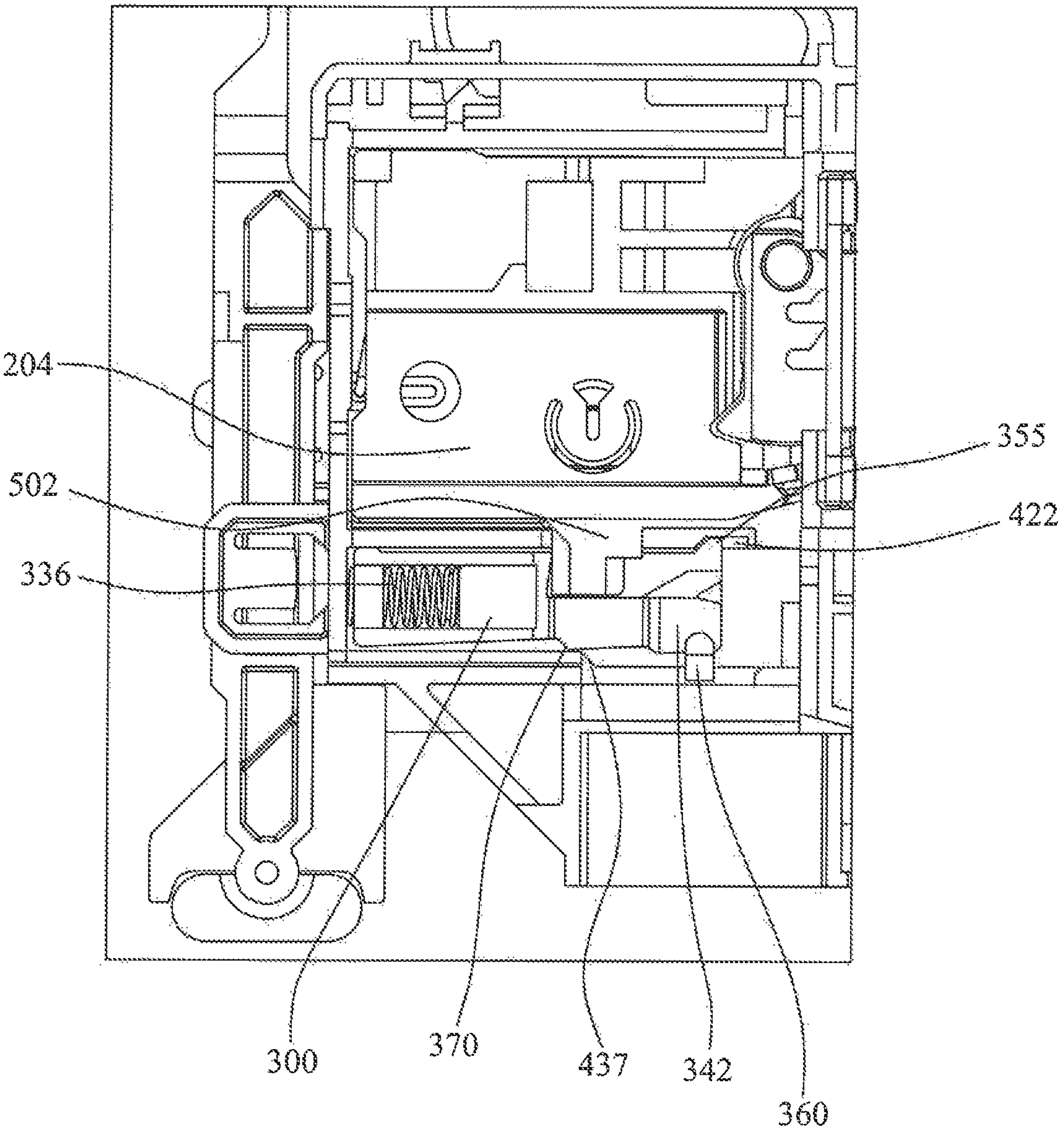

FIG. 8A to FIG. 8G show operational process drawings about the cooperation of relevant components in the door lock 100 of the present application. Here, FIG. 8A to FIG. 8D show the process in which the door lock 100 is from the open state to the closed state; and FIG. 8E to FIG. 8G show the process in which the door lock 100 is from the closed state to the open state.

As shown in FIG. 8A, the door lock 100 is in the open state at this time. The main sliding block 204 is in the leftmost position (i.e. released position), and the side part 603 of the push arm 502 on the main sliding block 204 presses against the blocking surface 326. Previously, in the process where the door hook 101 is pulled out of the cam 201, the push arm 502 pushes the indicating sliding block 300 to move the compression spring 336 to the left side to store the elastic potential energy, and pushes the indicating sliding block 300 to the leftmost end. At this time, the indicating sliding block 300 is blocked by the main sliding block 204 at the leftmost side and is unable to move. The head 362 of the indicating latch 360 is on the bearing surface 342 of the indicating sliding block 300, and the tail 361 of the indicating latch 360 props up the movable spring piece 702, so that the movable contact 703 leaves the fixed conductor rod 704 and disconnects the power circuit, and thus the indicating apparatus 706 outputs a second state signal (low level or high level). At this time, the main sliding block 204 is at the released position, the indicating sliding block 300 is at the open position, and the door lock 100 is in the open state.

As shown in FIG. 8B, as the door hook 101 enters the cam 201, the door lock 100 starts to close. The main sliding block 204 moves from the released position thereof to the locked position at the right side. The elastic force of the spring 336 helps the indicating sliding block 300 move to the right with the main sliding block 300, until the indicating sliding block protrusion locking claw 355 is blocked by the blocking surface 423 in the indicating sliding block sliding chute 402, and at this time the indicating sliding block 300 is temporarily unable to move. At this time, the head 362 of the indicating latch 360 is still on the bearing surface 342 of the indicating sliding block 300, and the tail 361 of the indicating latch 360 props up the movable spring piece 702, so that the movable contact 703 leaves the fixed conductor rod 704 and disconnects the power circuit, and thus the indicating apparatus 706 keeps the second state signal. At this time, the main sliding block 204 leaves the released position thereof and moves to the locked position, but the indicating sliding block 300 is still at the open position.

As shown in FIG. 8C, the main sliding block 204 continues to move to the right side, and the right side of the push arm 502 contacts the rotation bevel 324 on the indicating sliding block 300. The continuous movement of the push arm 502 will produce a component force that pushes the indicating sliding block 300 to move downward, pushing the distal end (right end) of the indicating sliding block 300 to rotate downward. At this time, the indicating sliding block protrusion locking claw 355 on the indicating sliding block 300 is still blocked by the blocking surface 423 in the indicating sliding block sliding chute 402, and therefore the indicating sliding block 300 is still unable to move. At this time, the head 362 of the indicating latch 360 is still on the bearing surface 342 of the indicating sliding block 300, and the tail 361 of the indicating latch 360 props up the movable spring piece 702, so that the movable contact leaves the fixed conductor rod 704 and disconnects the power circuit, and thus the indicating apparatus 706 keeps the second state signal. At this time, the main sliding block 204 moves to the locked position, and the indicating sliding block 300 is still at the open position.

As shown in FIG. 8D, the main sliding block 204 continues to move to the right side, and the right side of the push arm 502 passes by the middle or top of the rotation bevel 324 on the indicating sliding block 300. The push arm 502 pushes the distal end (right end) of indicating sliding block 300 to continue to rotate downward. When the distal end of the indicating sliding block 502 rotates downward by a certain angle (e.g. 2.0-2.5 degrees), the indicating sliding block protrusion locking claw 355 is pushed out of the notch 422. At this time, the indicating sliding block 300 is able to move because it is no longer blocked by the blocking surface 423 in the indicating sliding block sliding chute 402, and the elastic force of the spring 336 instantaneously ejects the indicating sliding block 300 to the end of the distal end (right end) of the indicating sliding block sliding chute 402. At the same time, the indicating latch 360 instantaneously moves from the bearing surface 342 to the recess 328, and the tail 361 of the indicating latch 360 moves down instantaneously, leaves the movable spring piece 702, and causes the movable contact 703 to contact the fixed conductor rod 704 to close the power circuit instantaneously, so that the second state signal output by the indicating apparatus 706 changes to the first state signal. At this time, the main sliding block 204 is at the locked position, the indicating sliding block 300 is at the closed position, and the door lock 100 is in the closed state.

As shown in FIG. 8E, the door hook 101 starts to be pulled out of the cam 201, the door lock 100 starts to open, the main sliding block 204 moves to the left side from the locked position thereof, and the side part 603 of the push arm 502 pushes the blocking surface 326, brings the indicating sliding block 300 to move to the left side, and compresses the spring 336 to the left to store the elastic potential energy. Since the head 362 of the indicating latch 360 is still in the recess 328 of the indicating sliding block 300 and the tail 361 of the indicating latch 360 does not contact the movable spring piece 702, the movable contact 703 contacts the fixed conductor rod 704 and closes the power circuit, so that the indicating apparatus 706 outputs and keeps the first state signal. At this time, the main sliding block 204 moves from the locked position thereof to the released position, but the indicating sliding block 300 is still at the closed position.

As shown in FIG. 8F, the main sliding block 204 continues to compress the spring 336 to move to the left side, and the restoration bevel 370 on the indicating sliding block 300 and the indicating sliding block recovery bevel 437 on the indicating sliding block sliding chute 402 start to contact and produce a force to push the indicating sliding block 300 to deflect upward, so that the indicating sliding block 300 starts to rotate upward, and the indicating sliding block protrusion locking claw 355 on the indicating sliding block 300 gradually enters the notch 422 of the indicating sliding block sliding chute 402. Since the head 362 of the indicating latch 360 moves to the bearing surface 342 of the indicating sliding block 300, the indicating latch 360 moves upward, the tail 361 of the indicating latch 360 props up the movable spring piece 702, and the movable contact 703 leaves the fixed conductor rod 704 and disconnects the power circuit, so that the first state signal output by the indicating apparatus 706 changes to the second state signal. At this time, the main sliding block 204 moves from the locked position thereof to the released position, and the indicating sliding block 300 is at the open position.

As shown in FIG. 8G, the main sliding block 204 continues to move to the left side to further compress the spring 336. The restoration bevel 370 on the indicating sliding block 300 passes by the middle or top of the indicating sliding block recovery bevel 437 on the indicating sliding block sliding chute 402, so that the indicating sliding block 300 starts to rotate upward. When the indicating sliding block 300 moves upward by a certain angle (2.0-2.5 degrees), the indicating sliding block 300 restores to the position parallel to the main sliding block 204, and the indicating sliding block protrusion locking claw 355 on the indicating sliding block 300 enters the notch 422 of the indicating sliding block sliding chute 402. Since the head 362 of the indicating latch 360 moves to the middle (or close to the middle) above the bearing surface 342 of the indicating sliding block 300, the tail 361 of the indicating latch 360 props up the movable spring piece 702, and the movable contact 703 leaves the fixed conductor rod 704 and disconnects the power circuit, so that the indicating apparatus 706 outputs and keeps the second state signal. At this time, the main sliding block 204 moves from the locked position thereof to the released position, the indicating sliding block 300 is at the open position, and the door lock 100 is in the open state (the state shown in FIG. 8A).

It should be noted that the locked position and the released position are in terms of the main sliding block 204; the open position and the closed position are in terms of the indicating sliding block 300; and the open state and the closed state are in terms of the door lock 100.

Figure 9:
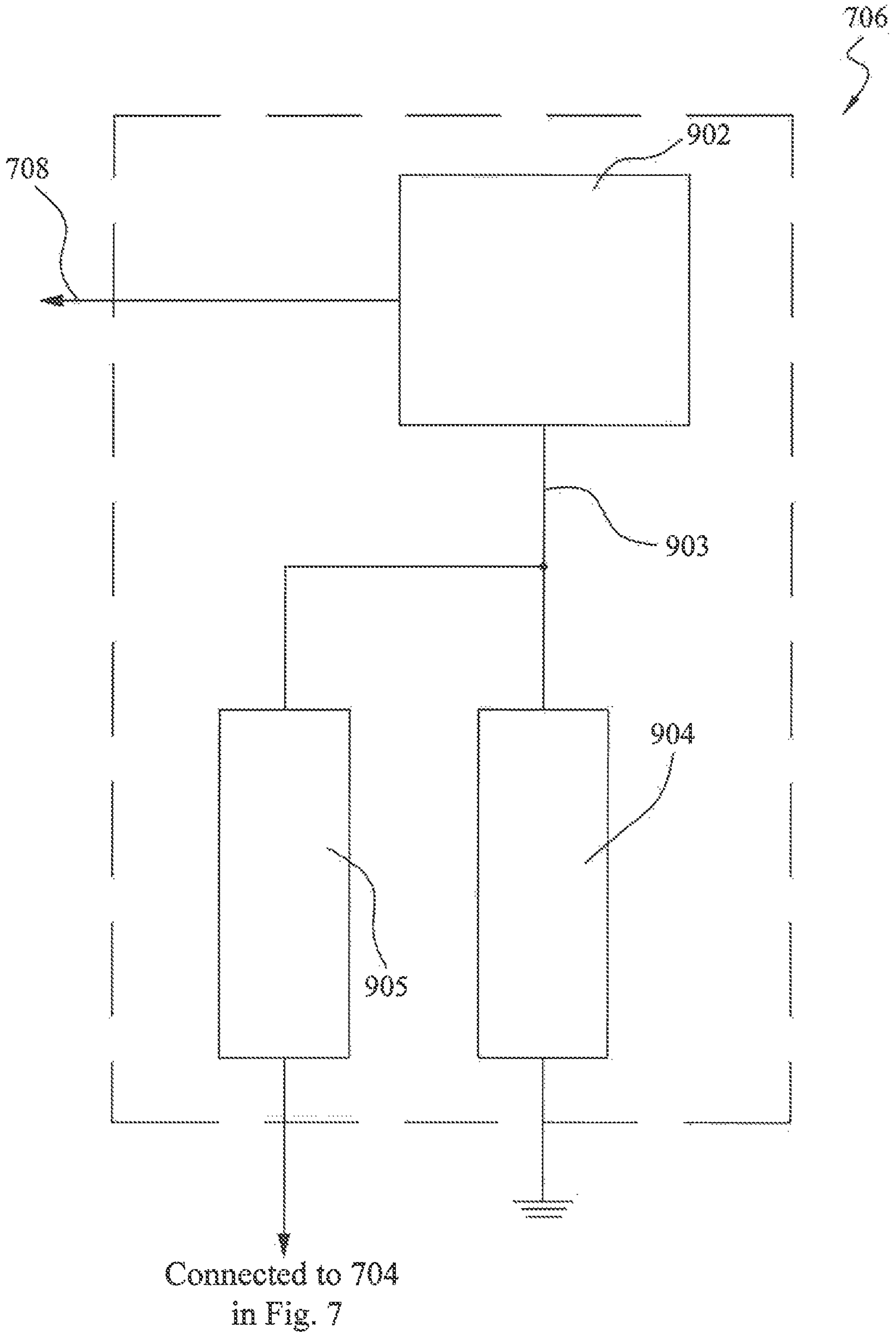
FIG. 9 is an embodiment of an indicating circuit 706 shown in FIG. 7A and FIG. 7B, to show the structure details of the indicating circuit 706.

FIG. 9 is an embodiment of an indicating circuit 706 shown in FIG. 7A and FIG. 7B, to show the structure details of the indicating circuit 706. As shown in FIG. 9, the indicating circuit 706 includes a flip-flop circuit 902, an input resistor 904 and a sampling resistor 905. A signal sampling input end 903 of the flip-flop circuit 902 is electrically connected to earth via the input resistor 904; and a signal input end 903 of the flip-flop circuit 902 is also electrically connected with the fixed conductor rod 704 shown in FIG. 7 via the sampling resistor 905. When the movable contact 703 is connected to the fixed conductor rod 704, a voltage signal is produced on the input resistor 904, so that the output end 708 of the flip-flop circuit 902 is set to a first state signal (high level or low level); and when the movable contact 703 is not connected to the fixed conductor rod 704, no voltage signal is produced on the input resistor 904, and the output end 708 of the flip-flop circuit 902 is set to a second state signal (low level or high level) In FIG. 9, the choice of the input resistor 904 and the sampling resistor 905 should make the current passing through the two resistors small, so that the partial current in the two resistors will not affect the work of the main circuit of the electric appliance.

A current door lock of an electric appliance is provided with a door lock state indicating apparatus for indicating whether the door lock is in the locked state or in the open state; and the output of the door lock state indicating apparatus is used for controlling the operation of the electric appliance (e.g. a washing machine). The current door lock of an electric appliance is also provided with a switching apparatus for disconnecting the power supply when the door lock is in the open state and for connecting the power supply when the door lock is in the closed state. In order to achieve the above two functions, the current door lock of an electric appliance adopts a sliding block and arrange a bevel on the sliding block, the bevel have positions of different heights at two sides, and a driving latch is slidably arranged on the bevel of the sliding block. As such, the movement of the sliding block in the horizontal direction can bring the driving latch to move up and down, and the up-down movement of the driving latch brings the contact to move up and down, so that the movable contact and the stationary contact of the switching apparatus contact and separate to close or disconnect the power supply of the electric appliance. At the same time, the state change of the switching apparatus drives the door lock state indicating apparatus to output a signal for indicating the door lock state. Some problems exist in this structure: firstly, the vibration produced due to the operation of the electric appliance will cause the sliding block to produce slight vibration or small movement, the slight vibration or small movement produced by the sliding block will be accordingly directly transferred to the driving latch via the bevel to cause the driving latch to vibrate up and down, while the up-down vibration of the driving latch will lead to a semi-contact state of the movable contact and the stationary contact, and the output signal state of the door lock state indicating apparatus will also be unstable; secondly, the speed of using the bevel on the sliding block to bring the driving latch to move is related to the speed of a user opening the door, and therefore the process in which the switching apparatus moves from the open position to the closed position may be continuous and relatively slow, and in this process the semi-contact state of the movable contact and the stationary contact easily appears, causing bad contact.

In the process in which the door lock 100 is from the open state to the closed state shown in FIG. 8A to FIG. 8D, the main sliding block 204 moves from the released position to the locked position and brings the indicating sliding block 300 to move from the open position and instantaneously jump to the closed position, the indicating latch 360 instantaneously jumps from the disconnected position to the closed position, and the movable contact 703 is instantaneously connected to the fixed conductor rod 704. Moreover, in this process, after the main sliding block 204 moves for a certain distance, the elasticity of the spring 336 brings the indicating sliding block 300 to instantaneously jump from the open position to the closed position, releasing the elastic potential energy of the spring 336. As shown in FIG. 8E to FIG. 8G, in the process in which the door lock is from the closed state to the open state, the main sliding block 204 first moves for a certain distance and then pushes the indicating sliding block 300 from the closed position to the open position. That is to say, in the above-mentioned two processes, the preliminary movement of the main sliding block 204 is an idle movement and does not cause the change in the open position or closed position of the indicating sliding block 300. Therefore, in the process of the operation of the electric appliance, although the vibration or small movement produced by the operation of the electric appliance will cause small movement or shake of the main sliding block 204, as the movement of the main sliding block 204 caused is just an idle movement, it will not cause the indicating sliding block 300 to move. Therefore, no matter whether the door lock 100 is in the closed state or in the open state, although the vibration or small movement produced by the operation of the electric appliance will cause small movement or shake of the main sliding block 204, the small movement or shake of the main sliding block 204 will not cause the indicating sliding block 300 to move. Therefore, in the process of the operation of the electric appliance, the indicating latch 360 can be steadily at the closed position or the open position, and the phenomenon where bad contact is caused due to small movement or shake of the main sliding block 204 will not appear. Moreover, the process in which the indicating sliding block 300 moves from the open position to the closed position is an instantaneous process, which causes the process in which the indicating latch 360 moves from the disconnected position to the closed position to be an instantaneous process, and will not cause the state of semi-linkage or bad contact when the movable contact and the stationary contact. In addition, the output state of the door lock state indicating apparatus 706 will also be stable, and the output state will not be made unstable due to the small shake of the main sliding block 204.

Although only some features of the present application are illustrated and described herein, a person skilled in the art may make various improvements and changes. Therefore, it should be understood that the appended claims are intended to cover all of the above-mentioned improvements and changes that fall into the substantial spirit scope of the present application.

The invention claimed is:

1. A door lock, comprising:

a main sliding block that is able to move to and fro between a locked position and a released position along a first direction, and the main sliding block being able to lock the door lock when at the locked position, and the main sliding block being able to release the door lock when at the released position; and an indicating sliding block that directly engages the main sliding block and is able to move to and fro with respect to and independently of the main sliding block and between a closed position and an open position along the first direction when the main sliding block moves to and fro between the locked position and the released position along the first direction, wherein the closed position and the open position of the indicating sliding block are used for indicating whether the door lock is in a locked state or in a released state.

2. The door lock of claim 1, further comprising:

an indicating apparatus that is able to output an indicating signal according to the closed position and the open position of the indicating sliding block, and the indicating signal being used for indicating whether the door lock is in the locked state or in the released state.

3. The door lock of claim 2, wherein:

the indicating sliding block is able to move to and fro between the closed position and the open position along the first direction; the indicating sliding block is able to move from the open position to the closed position when the main sliding block moves from the released position to the locked position; and the indicating sliding block is able to move from the closed position to the open position when the main sliding block moves from the locked position to the released position.

4. The door lock of claim 3, further comprising:

an indicating latch that is able to accordingly move to and fro along a second direction, that is orthogonal with respect to the first direction, when the indicating sliding block moves to and fro along the first direction, wherein the indicating latch is used for starting the indicating apparatus so that the indicating apparatus outputs the indicating signal.

5. The door lock of claim 1, wherein:

the indicating sliding block is arranged at one side of the main sliding block, and the main sliding block brings the indicating sliding block to move from the closed position to the open position.

6. A door lock, comprising:

a door hook;

a cam that selectively engages the door hook;

a main sliding block, the main sliding block being able to move to and fro between a locked position and a released position along a first direction, and the main sliding block being able to lock the door lock when at the locked position to prevent removal of the door hook from the cam, and the main sliding block being able to release the door lock when at the released position to permit removal of the door hook from the cam;

an indicating sliding block that is able to move to and fro with respect to the main sliding block and along the first direction when the main sliding block moves to and fro between the locked position and the released position along the first direction, wherein the indicating sliding block includes a rotation bevel that engages the main sliding block to rotate the indicating sliding block and define an included angle between the sliding block and the main sliding block when the main sliding block moves from the released position to the locked position;

an indicating latch that is able to move to and fro on an upper surface of the indicating sliding block, and the indicating latch being able to accordingly move to and fro along a second direction that is orthogonal with respect to the first direction when the indicating sliding block moves to and fro along the first direction; and a switching apparatus, with the indicating latch being able to close or disconnect the switching apparatus.

7. A door lock, comprising:

a door hook;

a cam that selectively engages the door hook;

a main sliding block, the main sliding block being able to move to and fro between a locked position and a released position along a first direction, and the main sliding block being able to lock the door lock when at the locked position to prevent removal of the door hook from the cam, and the main sliding block being able to release the door lock when at the released position to permit removal of the door hook from the cam;

an indicating sliding block that is able to move to and fro with respect to the main sliding block and along the first direction when the main sliding block moves to and fro between the locked position and the released position along the first direction;

an indicating latch that is able to move to and fro on an upper surface of the indicating sliding block, and the indicating latch being able to accordingly move to and fro along a second direction that is orthogonal with respect to the first direction when the indicating sliding block moves to and fro along the first direction; and a switching apparatus, with the indicting latch being able to close or disconnect the switching apparatus;

wherein:

the indicating sliding block is arranged at one side of the main sliding block, and the main sliding block brings the indicating sliding block to move from a closed position to an open position.

8. The door lock of claim 7, wherein:

a push arm is provided at one side of the main sliding block, and the push arm is able to bring the indicating sliding block to move from the closed position to the open position.

9. The door lock of claim 8, wherein:

the door lock further comprises a biasing apparatus, and the biasing apparatus pushes the indicating sliding block to move from the open position to the closed position.

10. The door lock of claim 9, wherein:

the biasing apparatus is a spring.

11. A door lock, comprising:

a main sliding block, the main sliding block being able to move to and fro between a locked position and a released position along a first direction, and the main sliding block being able to lock the door lock when at the locked position, and the main sliding block being able to release the door lock when at the released position;

an indicating sliding block that is able to move to and fro along the first direction when the main sliding block moves to and fro between the locked position and the released position along the first direction;

an indicating latch that is able to move to and fro on an upper surface of the indicating sliding block, and the indicating latch being able to accordingly move to and fro along a second direction that is orthogonal with respect to the first direction when the indicating sliding block moves to and fro along the first direction; and a switching apparatus, with the indicating latch being able to close or disconnect the switching apparatus wherein:

the indicating sliding block is arranged at one side of the main sliding block, and the main sliding block brings the indicating sliding block to move from a closed position to an open position;

the indicating sliding block comprises a stepped part, and the stepped part comprises an upper step and a lower step that are arranged by way of connection;

a bearing surface and a recess are provided on the upper step, the bearing surface is arranged at a distal end of the upper step, the bearing surface is higher than the recess, a distal end of the recess is connected to the bearing surface, and an indicating sliding block restoration part is provided at an outer side face at a proximal end of the recess;

an indicating sliding block release part is provided on an upper surface at a distal end of the lower step, a blocking surface is provided at a proximal end of the lower step, and the blocking surface is used for blocking the movement of the main sliding block when the main sliding block moves from the locked position to the released position; and an indicating sliding block protrusion locking claw extends out of an outer side face at the distal end of the lower step.

12. The door lock of claim 11, wherein:

the indicating sliding block restoration part comprises a restoration bevel, and the restoration bevel tilts inward in a direction from the distal end of the upper step to the proximal end; and the indicating sliding block release part comprises a rotation bevel, and the rotation bevel tilts outward in a direction from the proximal end of the lower step to the distal end.

13. The door lock of claim 11, further comprising:

a door lock box comprising an indicating sliding block sliding chute, and the indicating sliding block sliding chute comprising an inside wall and an outside wall; wherein a notch is provided at a distal end of the inside wall and used for accommodating the indicating sliding block protrusion locking claw, a blocking surface is provided at a distal end of the notch, and the blocking surface is used for blocking the movement of the indicating sliding block when the main sliding block moves from the released position to the locked position along the first direction; and an indicating sliding block recovery bevel is provided at a proximal end of the outside wall and used for cooperating with the indicating sliding block restoration part to restore the indicating sliding block.

14. A door lock, comprising:

a main sliding block configured to move to and fro between a locked position and a released position along a first direction, wherein the main sliding block locks the door lock when at the locked position and releases the door lock when at the released position; and an indicating sliding block that engages and is supported by a face-to-face surface engagement with and is movable independently with respect to the main sliding block, wherein:

movement of the main sliding block translates into movement of the indicating sliding block;

the indicating sliding block is able to move to and fro between a closed position and an open position along the first direction when the main sliding block moves to and fro between the locked position and the released position along the first direction; and the closed position and the open position of the indicating sliding block are used for indicating whether the door lock is in a locked state or in a released state.

* * * * *